United States Patent
Peng et al.

(10) Patent No.: US 10,317,970 B2
(45) Date of Patent: Jun. 11, 2019

(54) DISTRIBUTED OPTIMAL POWER FLOW PROCESSES FOR UNBALANCED RADIAL DISTRIBUTION NETWORKS

(71) Applicant: California Institute of Technology, Pasadena, CA (US)

(72) Inventors: Qiuyu Peng, Pasadena, CA (US); Steven H. Low, La Canada, CA (US)

(73) Assignee: California Institute of Technology, Pasadena, CA (US)

( * ) Notice: Subject to any disclaimer, the term of this patent is extended or adjusted under 35 U.S.C. 154(b) by 190 days.

(21) Appl. No.: 15/135,249

(22) Filed: Apr. 21, 2016

(65) Prior Publication Data
US 2016/0315807 A1    Oct. 27, 2016

Related U.S. Application Data

(60) Provisional application No. 62/150,411, filed on Apr. 21, 2015.

(51) Int. Cl.
G06F 1/26 (2006.01)
H04L 12/10 (2006.01)
H04L 12/24 (2006.01)

(52) U.S. Cl.
CPC .............. *G06F 1/266* (2013.01); *H04L 12/10* (2013.01); *H04L 41/0816* (2013.01); *H04L 41/0833* (2013.01); *Y04S 40/162* (2013.01)

(58) Field of Classification Search
CPC ..... G06F 1/266; H04L 12/10; H04L 41/0816; Y04S 40/162
See application file for complete search history.

(56) References Cited

U.S. PATENT DOCUMENTS 5,677,924 A * 10/1997 Bestwick .............. H01L 33/105
257/E33.069
7,076,360 B1 * 7/2006 Ma .......................... F02D 15/04
701/103

(Continued)

FOREIGN PATENT DOCUMENTS

JP    2012083989 A    4/2012
KR    101566715 B1    11/2015

(Continued)

OTHER PUBLICATIONS

Matt Kraning, Dynamic Network Energy Management via Proximal Message Passing, 2013, The Essence of Knowledge, vol. 1, p. 70-122.*

(Continued)

*Primary Examiner* — Arvin Eskandarnia
(74) *Attorney, Agent, or Firm* — KPPB LLP

(57) ABSTRACT

Node controllers and power distribution networks in accordance with embodiments of the invention enable distributed power control on an unbalanced network. One embodiment includes a node controller including a distributed power control application; a plurality of node operating parameters describing the operating parameter of a node in an unbalanced network; wherein the processor is configured by the distributed power control application to: send node operating parameters to nodes in the set of at least one node; receive operating parameters from the nodes in the set of at least one node; calculate a plurality of updated node operating parameters using an iterative process to determine updated node operating parameters using the node operating parameters that describe the operating parameters of the node, and the operating parameters of the set of at least one node, where each iteration in the iterative process involves (Continued)

evaluation of a subproblem; and adjust node operating parameters.

27 Claims, 16 Drawing Sheets

(56) References Cited

U.S. PATENT DOCUMENTS

| | | | |
|---|---|---|---|
| 9,225,171 | B2 | 12/2015 | Chen et al. |
| 9,418,318 | B2* | 8/2016 | Nadar .................... G06K 9/645 |
| 2011/0043220 | A1 | 2/2011 | Leibowitz et al. |
| 2012/0029720 | A1 | 2/2012 | Cherian et al. |
| 2012/0203388 | A1 | 8/2012 | DiLuciano et al. |
| 2012/0316691 | A1 | 12/2012 | Boardman et al. |
| 2012/0326503 | A1 | 12/2012 | Birkelund et al. |
| 2014/0025352 | A1 | 1/2014 | Ghosh et al. |
| 2014/0032007 | A1 | 1/2014 | Claessens et al. |
| 2016/0009192 | A1 | 1/2016 | Zhang et al. |
| 2016/0036226 | A1 | 2/2016 | Gan et al. |
| 2017/0110895 | A1 | 4/2017 | Low et al. |

FOREIGN PATENT DOCUMENTS

| | | |
|---|---|---|
| WO | 2012015507 A1 | 2/2012 |
| WO | 2012058114 A2 | 5/2012 |
| WO | 2012167383 A1 | 12/2012 |
| WO | 2016022603 A1 | 2/2016 |
| WO | 2016172348 A1 | 10/2016 |

OTHER PUBLICATIONS

International Preliminary Report on Patentability for International Application PCT/US2015/043676, Report issued Feb. 7, 2017, dated Feb. 16, 2017, 6 Pgs.
International Preliminary Report on Patentability for International Application PCT/US2016/028659, Report issued Oct. 24, 2017, dated Nov. 2, 2017, 10 Pgs.
International Search Report and Written Opinion for International Application No. PCT/US2015/043676, Search completed Oct. 27, 2015, dated Oct. 27, 2015, 8 Pgs.
International Search Report and Written Opinion for International Application No. PCT/US2016/028659, Search completed Jul. 27, 2016, dated Jul. 28, 2016, 12 Pgs.
Alsac et al., "Further developments in LP-based optimal power flow", IEEE Transactions on Power Systems, vol. 5, Issue 3, Aug. 1990, pp. 697-711.
Bai et al., "Semidefinite programming for optimal power flow problems", International Journal of Electrical Power & Energy Systems, vol. 30, Issues 6-7, Jul.-Sep. 2008, pp. 383-392.
Baldick, R. et al., "A fast distributed imple-mentation of optimal power flow", IEEE Transactions on Power Systems, vol. 14, Issue 3, Aug. 1999, pp. 858-864.
Baptista, E. C. et al., "Logarithmic barrier-augmented lagrangian function to the optimal power flow problem", International Journal on Electrical Power and Energy Systems, Jun. 23, 2005, vol. 27, No. 7, pp. 528-532.
Baran, M. E. et al., "Network reconfiguration in distribution systems for loss reduction and load balancing", IEEE Transactions on Power Delivery, Apr. 1989, vol. 4, No. 2, pp. 1401-1407.
Baran et al., "Optimal Capacitor Placement on radial distribution systems", IEEE Transactions on Power Deliver, vol. 4, Issue 1, Jan. 1989, pp. 725-734.
Baran et al., "Optimal Sizing of Capacitors Placed on a Radial Distribution System", IEEE Transactions on Power Delivery, vol. 4, Issue 1, Jan. 1989, pp. 735-743.
Boyd et al., "Distributed Optimization and Statistical Learning via the Alternating Direction Method of Multipliers", Foundations and Trends in Machine Learning, vol. 3, No. 1, 2010, pp. 1-122.
Capitanescu, F. et al., "Interior-point based algorithms for the solution of optimal power flow problems", Electric Power Systems Research, vol. 77, Issues 5-6, Apr. 2007, pp. 508-517, https://doi.org/10.1016/j.epsr.2006.05.003.
Contaxis, G. C. et al., "Decoupled Optimal Load Flow Using Linear or Quadratic Programming", IEEE Transactions on Power Systems, vol. 1, Issue 2, May 1986, pp. 1-7.
Dall'anese et al., "Distributed Optimal Power Flow for Smart Microgrids", IEEE Transactions on Smart Grid, vol. 4, Issue 3, Sep. 2013, pp. 1464-1475.
Devane, E. et al., "Stability and convergence of distributed algorithms for the OPF problem", 52nd IEEE Conference on Decision and Control, Dec. 10-13, 2013, Florence, Italy, pp. 2933-2938.
Farivar, M. et al., "Branch flow model: relaxations and convexification (parts I, II)", IEEE Trans. on Power Systems, Aug. 2013, vol. 28, No. 3, pp. 2554-2572.
Farivar, M. et al., "Inverter VAR control for distribution systems with renewables", In IEEE SmartGridComm, Oct. 17-20, 2011, pp. 457-462.
Farivar, M. et al., "Optimal Inverter VAR Control in Distribution Systems with High PV Penetration", In PES General Meeting, Jul. 22-26, 2012, pp. 1-7.
Gan, L. et al., "Convex Relaxations and Linear Approximation for Optimal Power Flow in Multiphase Radial Networks", In Power systems computation conference, Aug. 18-22, 2014, 9 pgs.
Gan et al., "Exact Convex Relaxation of Optimal Power Flow in Radial Networks", IEEE Transactions on Automatic Control, vol. 60, Issue: 1, Jan. 2015, pp. 72-87.
Grant, M. et al., "Cvx: Matlab software for disciplined convex programming", online at http://cvxr.com/cvx/, 2008, 2 pgs.
Jabr, R. A. et al., "A primal-dual interior-point method to solve the optimal power flow dispatching problem", Optimization and Engineering, Feb. 12, 2003, vol. 4, No. 4, pp. 309-336.
Jabr et al., "Radial Distribution Load Flow Using Conic Programming", IEEE Transactions on Power Systems, Aug. 2006, vol. 21, Issue 3, pp. 1458-1459.
Kersting, W. H., "Radial distribution test feeders", IEEE Transactions on Power Systems, vol. 6, Issue 3, Aug. 1991, pp. 975-985.
Kim, B. H. et al., "Coarse-grained distributed optimal power flow", IEEE Transactions on Power Systems, vol. 12, Issue 2, May 1997, pp. 932-939.
Lam, A. et al., "Optimal Distributed Voltage Regulation in Power Distribution Networks", arXiv:1204.5226, Apr. 23, 2012, retrieved from https://arxiv.org/abs/1204.5226v1, 24 pages.
Lam et al., "Distributed algorithms for optimal power flow problem", 2012 IEEE 51st IEEE Conference on Decision and Control (CDC), Dec. 10-13, 2012, Maui, HI, USA, pp. 430-437.
Lavaei et al., "Zero Duality Gap in Optimal Power Flow Problem", IEEE Transactions on Power Systems, vol. 27, Issue 1, Feb. 2012, pp. 92-107.
Li, N. et al., "Demand response in radial distribution networks: Distributed algorithm", 2012 Conference Record of the Forty Sixth Asilomar Conference on Signals, Systems and Computers (ASILOMAR), Nov. 4-7, 2012, Pacific Grove, CA, USA, pp. 1549-1553.
Low, "Convex Relaxation of Optimal Power Flow Part I: Formulations and Equivalence", IEEE Trans. on Control of Network Systems, Mar. 2014, 44 pgs.
Low, "Convex Relaxation of Optimal Power Flow—Part II: Exactness", IEEE Transactions on Control of Network Systems, Jun. 2014, vol. 1, No. 2, pp. 177-189.
Min, W. et al., "A trust region interior point algorithm for optimal power flow problems", Electrical Power and Energy Systems, May 2005, vol. 27, No. 4, pp. 293-300.
Peng et al., "Distributed algorithm for optimal power flow on a radial network", 53rd IEEE Conference on Decision and Control, Dec. 15-17, 2014, Los Angeles, CA, USA, pp. 167-172.
Sousa, A. A. et al., "Robust optimal power flow solution using trust region and interior methods", IEEE Transactions on Power Systems, May 2011, vol. 26, No. 2, pp. 487-499.
Stott, B. et al., "DC power flow revisited", IEEE Transactions on Power Systems, Aug. 2009, vol. 24, No. 3, pp. 1290-1300.
Stott, B. et al., "Fast decoupled load flow", IEEE Transactions on Power Apparatus and Systems, May 1974, vol. PAS-93(3), pp. 859-869.

(56) References Cited

OTHER PUBLICATIONS

Sturm, "Using SeDuMi 1.02, a matlab toolbox for optimization over symmetric cones", Optimization Methods and Software, Mar. 1999, vol. 11. No. 1-4, pp. 625-653.

Sun, A. X. et al., "Fully decentralized AC optimal power flow algorithms", 2013 IEEE Power & Energy Society General Meeting, Jul. 21-25, 2013, Vancouver, BC, Canada, pp. 1-5.

Torres, G. L. et al., "An interior-point method for nonlinear optimal power flow using voltage rectangular coordinates", IEEE Transactions on Power Systems, Nov. 1998, vol. 13, No. 4, pp. 1211-1218.

Turitsyn, K. et al., "Local control of reactive power by distributed photovoltaic generators", In IEEE SmartGridComm, Oct. 4-6, 2010, pp. 79-84.

Xiao, Y. et al., "Power flow control approach to power systems with embedded FACTS devices", IEEE Transactions on Power Systems, Nov. 2002, vol. 17, No. 4, pp. 943-950.

Zhang et al., "Geometry of feasible injection region of power networks", 2011 49th Annual Allerton Conference on Communication, Control, and Computing (Allerton), Sep. 28-30, 2011, pp. 1508-1515.

\* cited by examiner

| $\lambda_{i1}$: | $v_i^{(x)} = v_{ij}^{(y)}$ | | $\ell_{i0}^{(x)} = \ell_{ij}^{(y)}$ |
| --- | --- | --- | --- |
| $\mu_{ij}^{(1)}$: | $S_{i0}^{(x)} = S_{ij}^{(y)}$ | $\mu_{ij}^{(2)}$: | |
| $\mu_{ij}^{(3)}$: | $v_{i0}^{(x)} = v_{ij}^{(y)}$ | $\mu_{ij}^{(4)}$: | $s_{i0}^{(x)} = s_{ij}^{(y)}$ |
| $\mu_{iA_i}^{(1)}$: | $S_{iA_i}^{(x)} = S_{iA_i}^{(y)}$ | $\mu_{iA_i}^{(2)}$: | $\ell_i^{(x)} = \ell_{iA_i}^{(y)}$ |
| $\mu_{ij}$: | $v_{ij}^{(y)}$ | | |

FIG. 11

Pseudocode for Initialization

1: $V_i^a = 1, V_i^b = e^{-j\pi}, V_i^c = e^{j\pi}$ for $i \in \mathcal{N}$
2: Initialize $s_i^\phi$ using any point in the injection region $\mathcal{I}_i^\phi$ for $i \in \mathcal{N}$
3: Initialize $\{l_{ij}^\phi \mid \phi \in \Phi_i, i \in \mathcal{N}\}$ by calling DFS$(0, \phi)$ for $\phi \in \Phi_i$
4: $l_{i0}^{(x)} = V_i V_i^H, S_{i0}^{(x)} = l_{ii}^H, s_{i0}^{(x)} = V_i l_{ii}^H$ and $s_{i0}^{(x)} = s_i$ for $i \in \mathcal{N}$
5: $y_{ij} = x_{i0}$ for $j \in \mathcal{N}_i$ and $i \in \mathcal{N}$
6: $x_{i1} = x_{i0}$ for $i \in \mathcal{N}$
7: function DFS$(i, \phi)$
8: $\quad l_i^\phi = (\frac{s_i^\phi}{V_i^\phi})^*$
9: $\quad$ for $j \in C_i$ do
10: $\qquad l_i^\phi += $ DFS$(j, \phi)$
11: $\quad$ end for
12: $\quad$ return $l_i^\phi$
13: end function

*FIG. 12*

| Psuedocode for Distributed OPF process on Unbalanced Radial Networks |
|---|
| 1: Input: network $\mathcal{G}(\mathcal{N}, \mathcal{E})$, power injection region $\mathcal{I}_i$, voltage region $(\underline{v}_i, \overline{v}_i)$, line impedance $z_i$ for $i \in \mathcal{N}$. |
| 2: Output: voltage $v$, power injection $s$ |
| 3: Initialize the $x$ and $y$ variables using Algorithm 1. |
| 4: while $r^k > 10^{-4}\sqrt{|\mathcal{N}|}$ or $s^k > 10^{-4}\sqrt{|\mathcal{N}|}$ do |
| 5:   In the $x$-update, each agent $i$ solves both (33) and (39) to update $x_{i0}$ and $x_{i1}$. |
| 6:   In the $y$-update, each agent $i$ solves (40) to update $y_{ji}$ for $j \in \mathcal{N}_i$. |
| 7:   In the multiplier update, update $\lambda, \mu$ by (12c). |
| 8: end while |

FIG. 13

| Network | Diameter | Iteration | Total Time(s) | Avg time(s) |
|---|---|---|---|---|
| IEEE 13Bus | 6 | 289 | 17.11 | 1.32 |
| IEEE 34Bus | 20 | 547 | 78.34 | 2.30 |
| IEEE 37Bus | 16 | 440 | 75.67 | 2.05 |
| IEEE 123Bus | 30 | 608 | 306.3 | 2.49 |

FIG. 14

| Size | # of iterations (Line) | # of iterations (Fat tree) |
|---|---|---|
| 5 | 57 | 61 |
| 10 | 253 | 111 |
| 15 | 414 | 156 |
| 20 | 579 | 197 |
| 25 | 646 | 238 |
| 30 | 821 | 272 |
| 35 | 1353 | 304 |
| 40 | 2032 | 337 |
| 45 | 2026 | 358 |
| 50 | 6061 | 389 |

FIG. 16

DISTRIBUTED OPTIMAL POWER FLOW PROCESSES FOR UNBALANCED RADIAL DISTRIBUTION NETWORKS

CROSS-REFERENCE TO RELATED APPLICATIONS

The present invention claims priority to U.S. Provisional Patent Application Ser. No. 62/150,411 entitled "Distributed Algorithm for Optimal Power Flow Problem on a Radial Network" to Peng et al., filed Apr. 21, 2015. The disclosure of U.S. Provisional Patent Application Ser. No. 62/150,411 is herein incorporated by reference in its entirety.

STATEMENT OF FEDERALLY SPONSORED RESEARCH

This invention was made with government support under Grant No. DE-AR0000226 awarded by the Department of Energy. The government has certain rights in the invention.

FIELD OF THE INVENTION

The present invention generally relates to optimal power flow and more specifically to a closed form iterative processes for solving for optimal power flow in an unbalanced network.

BACKGROUND

An incredible amount of infrastructure is relied upon to transport electricity from power stations, where the majority of electricity is currently generated, to individual homes. Power stations can generate electricity in a number of ways including using fossil fuels or using renewable sources of energy such as solar, wind, and hydroelectric sources. Once electricity is generated it travels along transmission lines to substations. Substations typically do not generate electricity, but can change the voltage level of the electricity as well as provide protection to other grid infrastructure during faults and outages. From here, the electricity travels over distribution lines to bring electricity to individual homes. The infrastructure used to transport electricity through the power grid can be viewed as a graph comprised of nodes and lines. The power stations, substations, and any end user can be considered nodes within the graph. Transmission and distribution lines connecting these nodes can be represented by lines.

Distributed power generation, electricity generation at the point where it is consumed, is on the rise with the increased use of residential solar panels and is fundamentally changing the path electricity takes to many user's homes. The term "smart grid" describes a new approach to power distribution which leverages advanced technology to track and manage the distribution of electricity. A smart grid applies upgrades to existing power grid infrastructure including the addition of more renewable energy sources, advanced smart meters that digitally record power usage in real time, and bidirectional energy flow that enables the generation and storage of energy in additional locations along the electrical grid.

SUMMARY OF THE INVENTION

Node controllers and power distribution networks in accordance with embodiments of the invention enable distributed power control on an unbalanced network. One embodiment includes anode controller, comprising: a network interface; a processor; a memory containing: a distributed power control application; a plurality of node operating parameters describing the operating parameter of a node in an unbalanced network; and a plurality of node operating parameters describing operating parameters for a set of at least one node selected from the group consisting of an ancestor node and at least one child node; wherein the processor is configured by the distributed power control application to: send node operating parameters to nodes in the set of at least one node; receive operating parameters from the nodes in the set of at least one node; calculate a plurality of updated node operating parameters using an iterative process to determine the updated node operating parameters using the node operating parameters that describe the operating parameters of the node, and the operating parameters of the set of at least one node, where each iteration in the iterative process involves evaluation of a subproblem; and adjust the node operating parameters.

In a further embodiment, the subproblem further comprises a closed form solution.

In another embodiment, the subproblem further comprises an eigen-decomposition.

In a still further embodiment, the iterative process further comprises an alternating direction method of multipliers (ADMM) process.

In still another embodiment, the ADMM process further comprises an x-update process, wherein the x-update process comprises minimizing an augmented Lagrangian for an augmented Relaxed Optimal Power Flow (ROPF) expression.

In a yet further embodiment, the x-update process is subject to the following constraints:

$$\min \quad H_{i0}(x_{i0})$$
$$\text{over} \quad x_{i0} = \{v_{i0}^{(x)}, \ell_{i0}^{(x)}, S_{i0}^{(x)}, s_{i0}^{(x)}\}$$
$$\text{s.t.} \quad \begin{pmatrix} v_{i0}^{(x)} & S_{i0}^{(x)} \\ (S_{i0}^{(x)})^H & \ell_{i0}^{(x)} \end{pmatrix} \in \mathbb{S}_+$$
$$(s_{i0}^\phi)^{(x)} \in \mathcal{T}_i^\phi \quad \phi \in \Phi_i,$$
$$\min \quad H_{i1}(x_{i1})$$
$$\text{over} \quad x_{i1} = \{v_{i1}^{(x)}\}$$
$$\text{s.t.} \quad \underline{v}_i^\phi \leq (v_{i1}^{\phi\phi})^{(x)} \leq \overline{v}_i^\phi \quad \phi \in \Phi_i,$$

where H is a hermitian matrix, i is the node, v, l, S, and s are constraints, $\mathbb{S}$ is a set of hermitian matrices, and $\phi$ is a phase of the unbalanced network.

In yet another embodiment, the ADMM process further comprises a y-update process, where the y-update process comprises minimizing an augmented Lagrangian for an augmented Relaxed Optimal Power Flow (ROPF) expression.

In a further embodiment again, the y-update process is subject to the following constraints:

$$\min \quad G_i(\{y_{ji} \mid j \in N_i\})$$
$$\text{over} \quad \{y_{ji} \mid j \in N_i\}$$
$$\text{s.t.} \quad \mathcal{P}_i(v_{A_ii}^{(y)}) = v_{ii}^{(y)} - z_i(S_{ii}^{(y)})^H - S_{ii}^{(y)} z_i^H + z_i \ell_{ii}^{(y)} z_i^H$$

-continued $$s_{ii}^{(y)} = -\text{diag}\left(\sum_{i \in C_i} \mathcal{P}_i(S_{ji}^{(y)} - z_j \ell_{ji}^{(y)}) - S_{ii}^{(y)}\right),$$

where G and N are matrices, i is the node, j is the child node, $A_i$ is the ancestor node, $C_i$ is the set of child nodes, and v, l, S, and s are constraints.

In another embodiment again, the ADMM process further comprises a Lagrange multiplier update process, where the Lagrange multiplier expression comprises a set of Lagrange multipliers.

In a further additional embodiment, each Lagrange multiplier in the set of Lagrange multipliers is evaluated by the processor using the following expression:

$$\lambda^{k+1} = \lambda^k + \rho(x^{k+1} - y^{k+1})$$

where $\lambda$ is a Lagrange multiplier in the set of Lagrange multipliers, k is a current iteration, k+1 is a next iteration, $\rho$ is a constant, and x−y is a constraint.

In still yet another embodiment, the updated node operating parameters are further calculated using the node operating parameters that describe a set of operating parameters of at least one node selected from the group consisting of an ancestor node of the ancestor node and at least one child node of the at least one child node.

In another additional embodiment, the node operating parameters include power injection, voltage, branch current to the ancestor node, and branch power flow to the ancestor node.

In a still yet further embodiment, a power distribution network, comprising: one or more centralized computing systems; a communications network; a plurality of node controllers, wherein each node controller in the plurality of node controllers contains: a network interface; a node processor; and a memory containing: a distributed power control application; a plurality of node operating parameters describing the operating parameters of a node in an unbalanced network; and a plurality of node operating parameters describing operating parameters for a set of at least one node selected from the group consisting of an ancestor node and at least one child node; wherein the node processor is configured by the distributed power control application to: send node operating parameters to nodes in the set of at least one node; receive operating parameters from the nodes in the set of at least one node; calculate a plurality of updated node operating parameters using an iterative process to determine the updated node operating parameters using the node operating parameters that describe the operating parameters of the node, and the operating parameters of the nodes in the set of at least one node, where each iteration in the iterative process involves evaluation of a subproblem; and adjust the node operating parameters.

In still yet another embodiment, the subproblem further comprises a closed form solution.

In a still further embodiment again, the subproblem further comprises an eigen-decomposition.

In still another embodiment again, the iterative process is part of a distributed process for achieving Optimal Power Flow (OPF) that is simplified using a convex relaxation.

Another further embodiment of the method of the invention includes: the convex relaxation is a semidefinite program (SDP).

Still another further embodiment of the method of the invention includes: the node controllers are modeled in the centralized computing system as an unbalanced radial network.

In a further embodiment again, the iterative process further comprises an alternating direction method of multipliers (ADMM) process.

In a further embodiment again, the ADMM process further comprises an x-update process, wherein the x-update process comprises minimizing an augmented Lagrangian for an augmented Relaxed Optimal Power Flow (ROPF) expression.

In another embodiment again, the x-update process is subject to the following constraints:

$$\min \quad H_{i0(x_{i0})}$$
$$\text{over} \quad x_{i0} = \{v_{i0}^{(x)}, \ell_{i0}^{(x)}, S_{i0}^{(x)}, s_{i0}^{(x)}\}$$
$$\text{s.t.} \quad \begin{pmatrix} v_{i0}^{(x)} & S_{i0}^{(x)} \\ (S_{i0}^{(x)})^H & \ell_{i0}^{(x)} \end{pmatrix} \in \mathbb{S}_+$$
$$\left(s_{i0}^\phi\right)^{(x)} \in \mathcal{J}_i^\phi \quad \phi \in \Phi_i,$$

$$\min \quad H_{i1}(x_{i1})$$
$$\text{over} \quad x_{i1} = \{v_{i1}^{(x)}\}$$
$$\text{s.t.} \quad \underline{v}_i^\phi \leq \left(v_{i1}^{\phi\phi}\right)^{(x)} \leq \overline{v}_i^\phi \quad \phi \in \Phi_i,$$

where H is a hermitian matrix, i is the node, v, l, S, and s are constraints, $\mathbb{S}$ is a set of hermitian matrices, and $\phi$ is a phase of the unbalanced network.

In a further additional embodiment, the ADMM process further comprises a y-update process, where the y-update process comprises minimizing an augmented Lagrangian for an augmented Relaxed Optimal Power Flow (ROPF) expression.

In another additional embodiment, the y-update process is subject to the following constraints:

$$\min G_i(\{y_{ji} \mid j \in N_i\})$$
$$\text{over} \quad \{y_{ji} \mid j \in N_i\}$$
$$\text{s.t.} \quad \mathcal{P}_i(v_{A_i i}^{(y)}) = v_{ii}^{(y)} - z_i(S_{ii}^{(y)})^H - S_{ii}^{(y)} z_i^H + z_i \ell_{ii}^{(y)} z_i^H$$
$$s_{ii}^{(y)} = -\text{diag}\left(\sum_{i \in C_i} \mathcal{P}_i(S_{ji}^{(y)} - z_j \ell_{ji}^{(y)}) - S_{ii}^{(y)}\right),$$

where G and N are matrices, i is the node, j is the child node, $A_i$ is the ancestor node, $C_i$ is the set of child nodes, and v, l, S, and s are constraints.

In a still yet further embodiment, the ADMM process further comprises a Lagrange multiplier update process, where the Lagrange multiplier expression comprises a set of Lagrange multipliers.

In still yet another embodiment, each Lagrange multiplier in the set of Lagrange multipliers is evaluated by the processor using the following expression:

$$\lambda^{k+1} = \lambda^k + \rho(x^{k+1} - y^{k+1})$$

where $\lambda$ is a Lagrange multiplier in the set of Lagrange multipliers, k is a current iteration, k+1 is a next iteration, $\rho$ is a constant, and x-y is a constraint.

In a still further embodiment again, the updated node operating parameters are further calculated using the node operating parameters that describe a set of operating parameters of at least one node selected from the group consisting of an ancestor node of the ancestor node and at least one child node of the at least one child node.

In still another embodiment again, the node operating parameters include power injection, voltage, branch current to the ancestor node, and branch power flow to the ancestor node.

BRIEF DESCRIPTION OF THE DRAWINGS

FIG. 11 is a table illustrating multipliers associated with parameters in accordance with an embodiment of the invention.

FIG. 12 is pseudocode illustrating a process for initializing distributed power control for an unbalanced network in accordance with an embodiment of the invention.

FIG. 13 is pseudocode illustrating a process for distributed power control on an unbalanced network in accordance with an embodiment of the invention.

FIG. 14 is a table illustrating statistics of different simulated networks in accordance with an embodiment of the invention.

FIG. 16 is a table illustrating statistics of different simulated line and fat tree networks in accordance with an embodiment of the invention.

DETAILED DESCRIPTION

Figure 1:
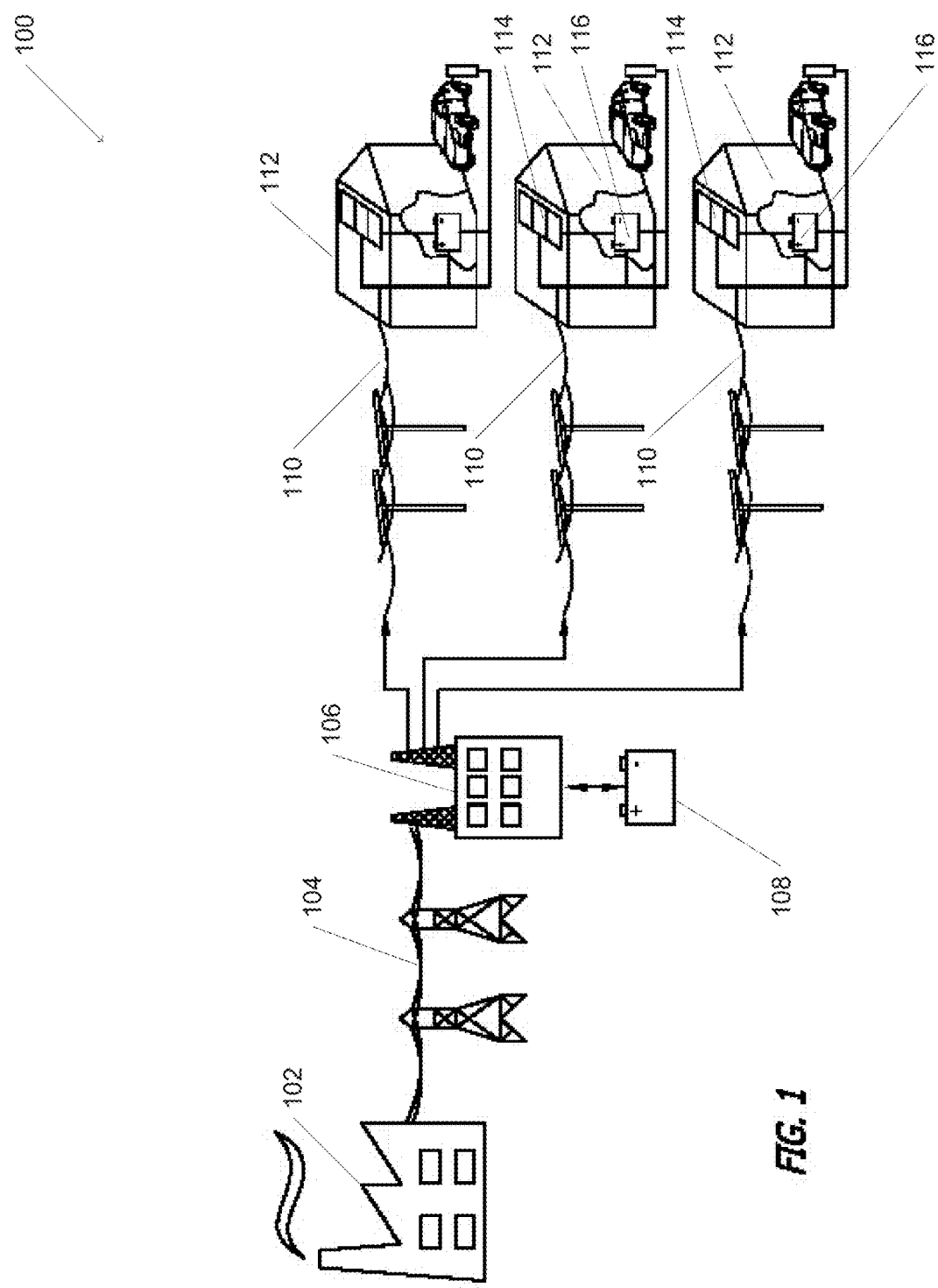
FIG. 1 is a diagram conceptually illustrating a power distribution network in accordance with an embodiment of the invention.

Turning now to the drawings, systems and methods for distributed control of power distribution systems configured as an unbalanced radial networks in accordance with embodiments of the invention are illustrated. Radial networks have a tree topology where each node is connected to a single unique ancestor and a set of unique children and radial networks are commonly utilized in modeling the distribution side of the power grid. In many embodiments, processing nodes are distributed throughout the power distribution network that control power load, distributed power generation, and remote battery storage. In several embodiments, the processing nodes control the operational parameters of aspects of the power distribution network in an effort to achieve what is often referred to as Optimal Power Flow (OPF). Achieving OPF involves optimizing the operation of a power system with respect to one or more objectives. These objectives can include (but are not limited to) minimizing the amount of power lost during the transmission of power to a user, minimizing the cost of generating the power needed for the system, and/or seeking to optimize other general operational constraints.

In a number of embodiments, the processing nodes within the power distribution network perform centralized, distributed, or hybrid processes that coordinate the control of the power distribution network. Centralized processes can use a centralized processing unit to calculate optimal power flow of all nodes within the network. Distributed processes can be based upon messages passed between the processing node and its ancestor and/or child nodes within the radial network. Hybrid processes use a combination of centralized and distributed process steps. In several embodiments, individual processing nodes determine the voltage, power injection, current, and/or impedance of a given power load, distributed power generation, or remote battery storage within the power distribution network by performing a closed form calculation using information received by power and/or child nodes. In many embodiments, the specific calculation utilized by the processing nodes is selected based upon a distributed solution for optimal power flow of the power distribution network obtained using alternating direction method of multiplies (ADMM).

In various embodiments, an ADMM process can reduce an optimal power flow problem to either a closed form solution or an eigen-decomposition of a hermitian matrix of a small size. Use of an expression that can either be closed form or an eigen-decomposition of a hermitian matrix obtained in the manner described below can be particularly advantageous relative to techniques for performing distributed control of a power distribution network to achieve OPF requiring the use of an iterative optimization process at each processing node. Specifically, performing a single set of calculations to obtain the control parameters as opposed to repeatedly iterating a set of calculations to obtain the control parameters can be significantly more computationally efficient and can enable the power distribution network to adapt to changes with much lower latency. Additional computational efficiencies may be obtained by a conic relaxation of the distribution network, for example by using a second order cone program (SOCP) relaxation.

Systems and methods for performing distributed control of unbalanced radial power distribution networks to achieve OPF and solutions to the distributed unbalanced OPF problem that can be utilized in the implementation of such systems and methods in accordance with embodiments of the invention are discussed further below.

Radial Power Distribution Networks

A power distribution network in accordance with an embodiment of the invention is shown in FIG. 1. Electricity is generated in power generator 102. Power transmission lines 104 can transmit electricity between the power generator and power substation 106. Power substation 106 additionally can connect to large storage battery 108 which temporarily stores electricity, as well as power distribution lines 110. The power distribution lines 110 can transmit electricity from the power substation to homes 112. The homes can include solar panels 114, a house battery 116, and/or an electric car 118. Power distribution networks can transmit electricity in many ways. When alternating current is used, voltage reverses direction at regular intervals. When only one voltage source is used, the power distribution network is described as single phase. When several sources are used, and the sources are distributed in equally spaced regular intervals (typically 120 degrees for a commonly used three phase network), the power distribution network is described as multiphase balanced network. Single phase and multiphase balanced network problems can often be solved with similar analysis.

In the discussions to follow, networks that distribute power in a multiphase unbalanced manner will be referred to as multiphase networks. Single phase and multiphase balanced networks will be referred to as single phase networks.

The power generator 102 can represent a power source including those using fossil fuels, nuclear, solar, wind, or hydroelectric power. Substation 106 changes the voltage of the electricity for more efficient power distribution. Solar panels 114 are distributed power generation sources, and can generate power to supply the home as well as generate additional power for the power grid. House battery 116 can store excess electricity from the solar panels to power the home when solar energy is unavailable, or store electricity from the power grid to use at a later time. Substations 106, large storage batteries 108, homes 112, solar panels 114, house batteries 116, and electric cars 118 can all be considered to be nodes within the power distribution network and the distribution lines 110 can be considered to be lines within the power distribution network. In combination, the nodes and lines form a radial network. In many embodiments, node controllers are located at nodes throughout the network to control the operating parameters of different nodes to achieve OPF. The type of control utilized can depend on the specifics of the network and may include distributed, centralized, and/or hybrid power control. Although many different systems are described above with reference to FIG. 1, any of a variety of power distribution network including node controllers may be utilized to perform power distribution as appropriate to the requirements of specific applications in accordance with embodiments of the invention. Nodes utilizing node controllers connected to a communication network in accordance with various embodiments of the invention are discussed further below.

Node Controller Architectures

Figure 2:
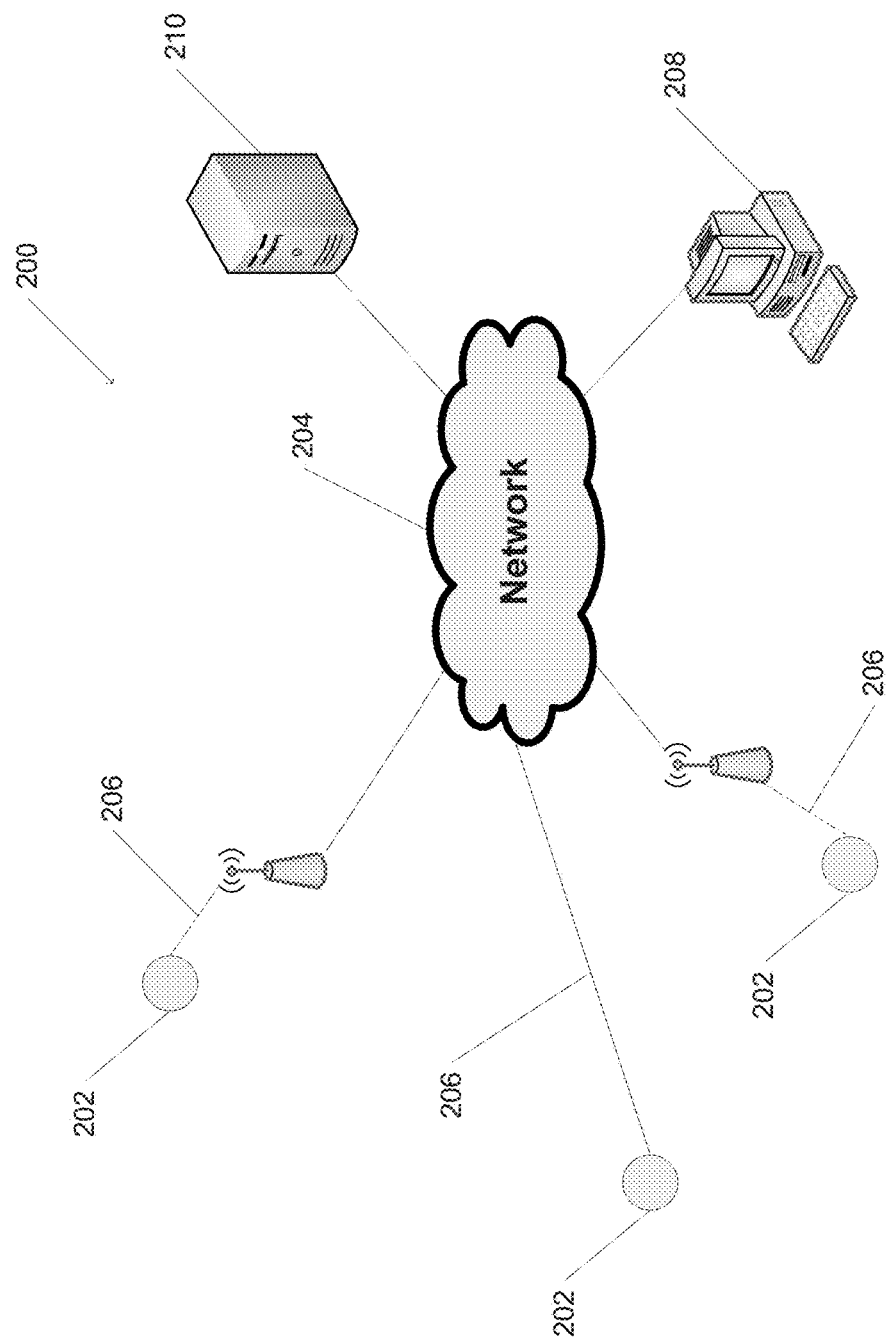
FIG. 2 is a diagram conceptually illustrating nodes utilizing node controllers connected to a communication network in accordance with an embodiment of the invention.

Nodes utilizing node controllers connected to a communication network in accordance with an embodiment of the invention are shown in FIG. 2. Nodes 202 can connect to communication network 204 using a wired and/or wireless connection 206. In some embodiments the power distribution network can act in place of the communication network. The communication network may also be connected to one or more centralized computers 208 to monitor calculations made by or to send instructions to multiple nodes to, for example, control power distribution in the network at a global level. Additionally, in many embodiments a database management system 210 can be connected to the network to track node data which, for example, may be used to historically track power usage at various locations over time. Although many systems are described above with reference to FIG. 2, any of a variety of systems can be utilized to perform connecting nodes to a network as appropriate to the requirements of specific applications in accordance with embodiments of the invention. Node controllers in accordance with various embodiments of the invention are discussed further below.

Figure 3:
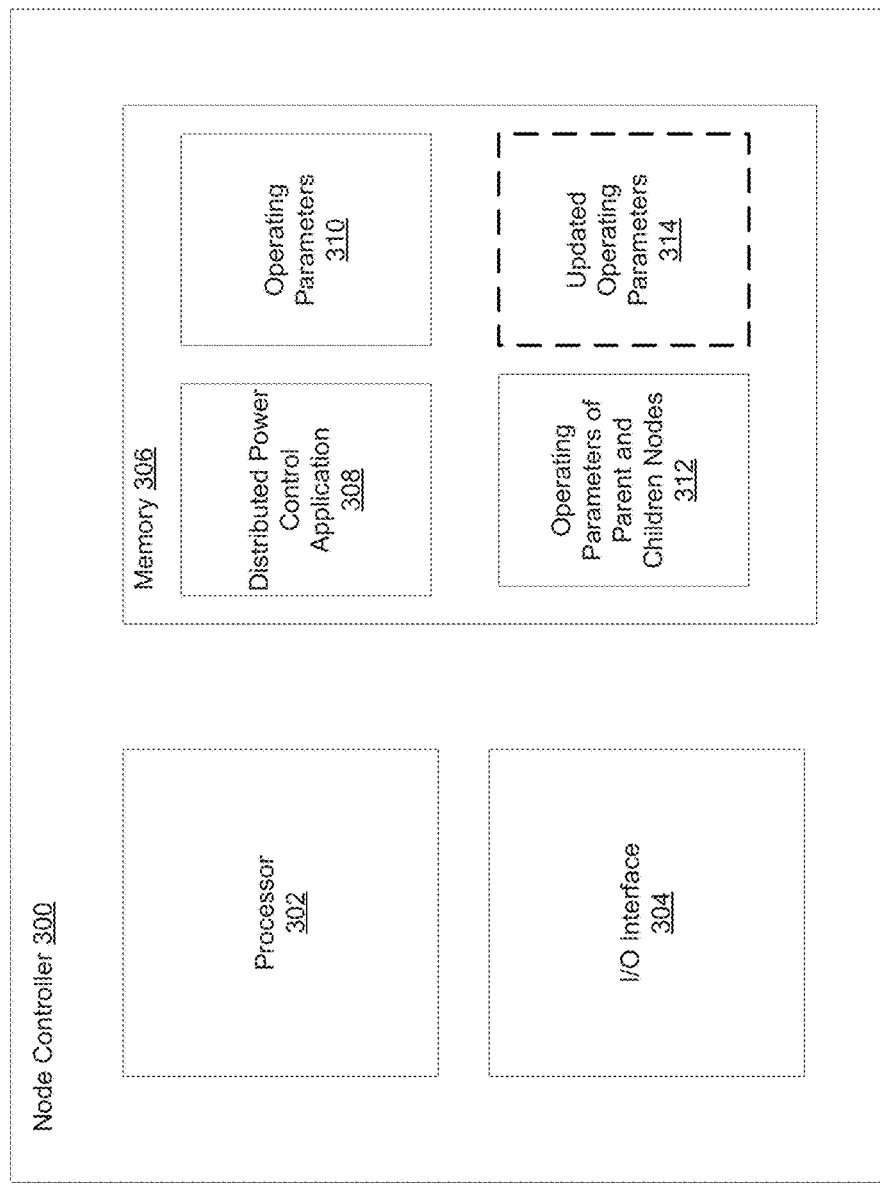
FIG. 3 is a block diagram of a node controller in accordance with an embodiment of the invention.

A node controller in accordance with an embodiment of the invention is shown in FIG. 3. In various embodiments, node controller 300 can perform calculations in a distributed manner at a node in the radial network. The node controller includes at least one processor 302, an I/O interface 304, and memory 306. The at least one processor 302, when configured by software stored in memory, can perform calculations on and make changes to data passing through the I/O interface as well as data stored in memory. In many embodiments, the memory 306 includes software including the distributed power control application 308 as well as operating parameters 310, operating parameters of ancestor and children nodes 312, and updated operating parameters 314. A node can calculate updated operating parameters by using a combination of its own node operating parameters, and/or operating parameters received through the I/O interface from its ancestor and children nodes, and/or operating parameters received from a centralized computer in the case of a centralized or hybrid approach. The distributed power control application 308 will be discussed in greater detail below and can enable the node to perform calculations to solve for optimal power flow in a distributed manner. In many embodiments, the distributed power control application can be applied to unbalanced radial networks. These distributed calculations preformed on the current operating parameters can specifically involve evaluating an OPF problem to solve for either a closed form expression or an eigen-decomposition of a hermitian matrix expression when solving for optimal power flow. Various operating parameters of a node that can be controlled by a node controller are also discussed further below, and may include (but are not limited to) node voltage, current, impedance, and power injection. Although a number of different node controller implementations are described above with reference to FIG. 3, any of a variety of computing systems can be utilized to control a node within a power distribution system as appropriate to the requirements of specific applications in accordance with various embodiments of the invention. As noted above, node controllers in accordance with many embodiments of the invention can control the operation of nodes within a radial power distribution network in such a way as to approach OPF. Use of node controllers to implement OPF in a distributed manner within a radial network in accordance with various embodiments of the invention are discussed further below.

Use of Node Controllers to Achieve Optimal Power Flow

Node controllers in accordance with many embodiments of the invention utilize processes that control nodes in a manner that attempts to achieve OPF in a computationally efficient manner. In order to do this, a closed form expression has been developed enabling calculations to preform at each node concurrently. The term 'closed form expression' refers to a calculation that can be performed in a finite number of operations. Overall the closed form solution for OPF can be more computationally efficient and predictable to compute than the use of an iterative process by a node controller to determine operating parameters. Various models can be used to develop a closed form solution that can be utilized to achieve OPF in a distributed manner.

The branch flow model (BFM) and the bus injection model (BIM) can be used for solving the OPF problem. The BFM focuses on the current and power in the branches of the model, and the BIM focuses of current, voltage, and power injection at the nodes of the model. Although the BFM and the BIM are generated with different sets of equations and variables, they produce related solutions since they are both modeled based on Kirchhoffs laws. The process utilized by the processing nodes in accordance with various embodiments of the invention utilizes calculations determined by the BFM. Many network shapes can be used to construct the BFM, such as a radial network. In certain cases the structure of a radial network can simplify the computations of the power equations in the OPF problem. Additionally, a convex relaxation of the model can further simplify the calculations. An approach to solve OPF of an unbalanced network in a distributed manner using a semidefinite program (SDP) relaxation is described in detail below. As can readily be appreciated, any of a variety of techniques that can be utilized to solve the OPF in a distributed closed form manner can be utilized as the basis for configuring node controllers as appropriate to the requirements of specific applications in accordance with various embodiments of the invention. Therefore, the inventions described herein should not be considered to be limited to the specific closed form expressions discussed below.

Use of Node Controllers to Achieve Optimal Power Flow

Node controllers in accordance with many embodiments of the invention utilize processes that control nodes in a manner that attempts to achieve OPF in a computationally efficient manner. In order to do this, a closed form expression has been developed enabling calculations to performed at each node concurrently. The term 'closed form expression' refers to a calculation that can be performed in a finite number of operations. Overall the closed form solution for OPF can be more computationally efficient and predictable to compute than the use of an iterative process by a node controller to determine operating parameters. Various models can be used to develop a closed form solution that can be utilized to achieve OPF in a distributed manner.

The branch flow model (BFM) and the bus injection model (BIM) can be used for solving the OPF problem. The BFM focuses on the current and power in the branches of the model, and the BIM focuses of current, voltage, and power injection at the nodes of the model. Although the BFM and the BIM are generated with different sets of equations and variables, they produce related solutions since they are both modeled based on Kirchhoffs laws. The process utilized by the processing nodes in accordance with various embodiments of the invention utilizes calculations determined by the BFM. Many network shapes can be used to construct the BFM, such as a radial network. In certain cases the structure of a radial network can simplify the computations of the power equations in the OPF problem. Additionally, a convex relaxation of the model can further simplify the calculations. An approach to solve OPF in a distributed closed form manner using a second order cone program (SOCP) conic relaxation is described in detail below. As can readily be appreciated, any of a variety of techniques that can be utilized to solve the OPF in a distributed closed form manner can be utilized as the basis for configuring node controllers as appropriate to the requirements of specific applications in accordance with various embodiments of the invention. Therefore, the inventions described herein should not be considered to be limited to the specific closed form expressions discussed below.

Branch Flow Model

Figure 4:
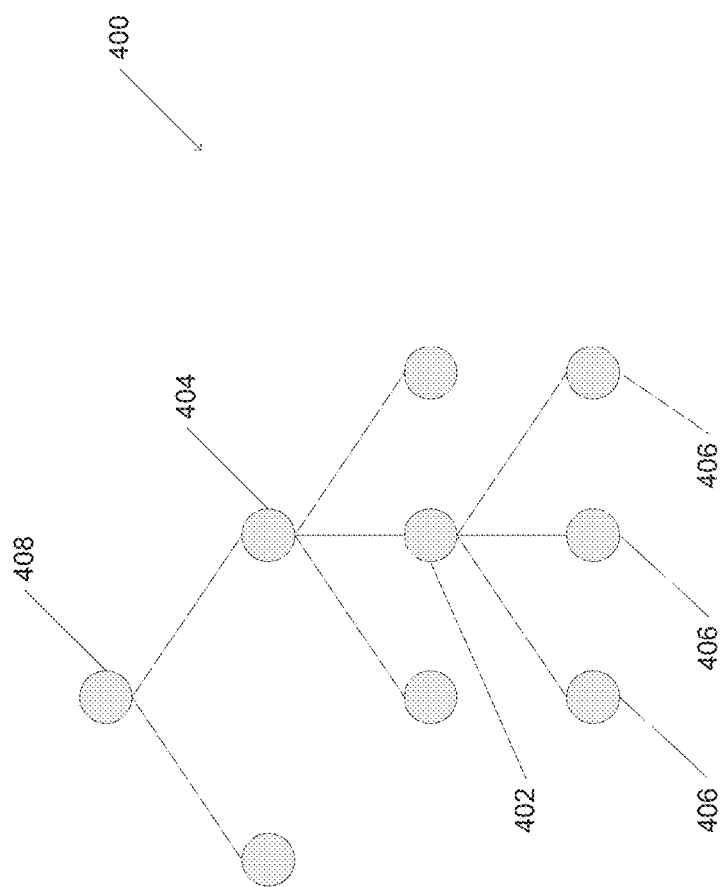
FIG. 4 is diagram illustrating a radial network in accordance with an embodiment of the invention.

A radial network in accordance with an embodiment of the invention is shown in FIG. 4. In various embodiments, radial network 400 includes a node 402. Node 402 has an ancestor node 404 and one or more children nodes 406. A radial network also has a unique root node 408. A detailed discussion of these nodes is discussed further below. Although many radial networks are described above with reference to FIG. 3, any of a variety of network configurations can be utilized as the network shape as appropriate to the requirements of specific applications in accordance with embodiments of the invention. The relationship between nodes and operation parameters in a BFM is discussed further below.

Figure 5:
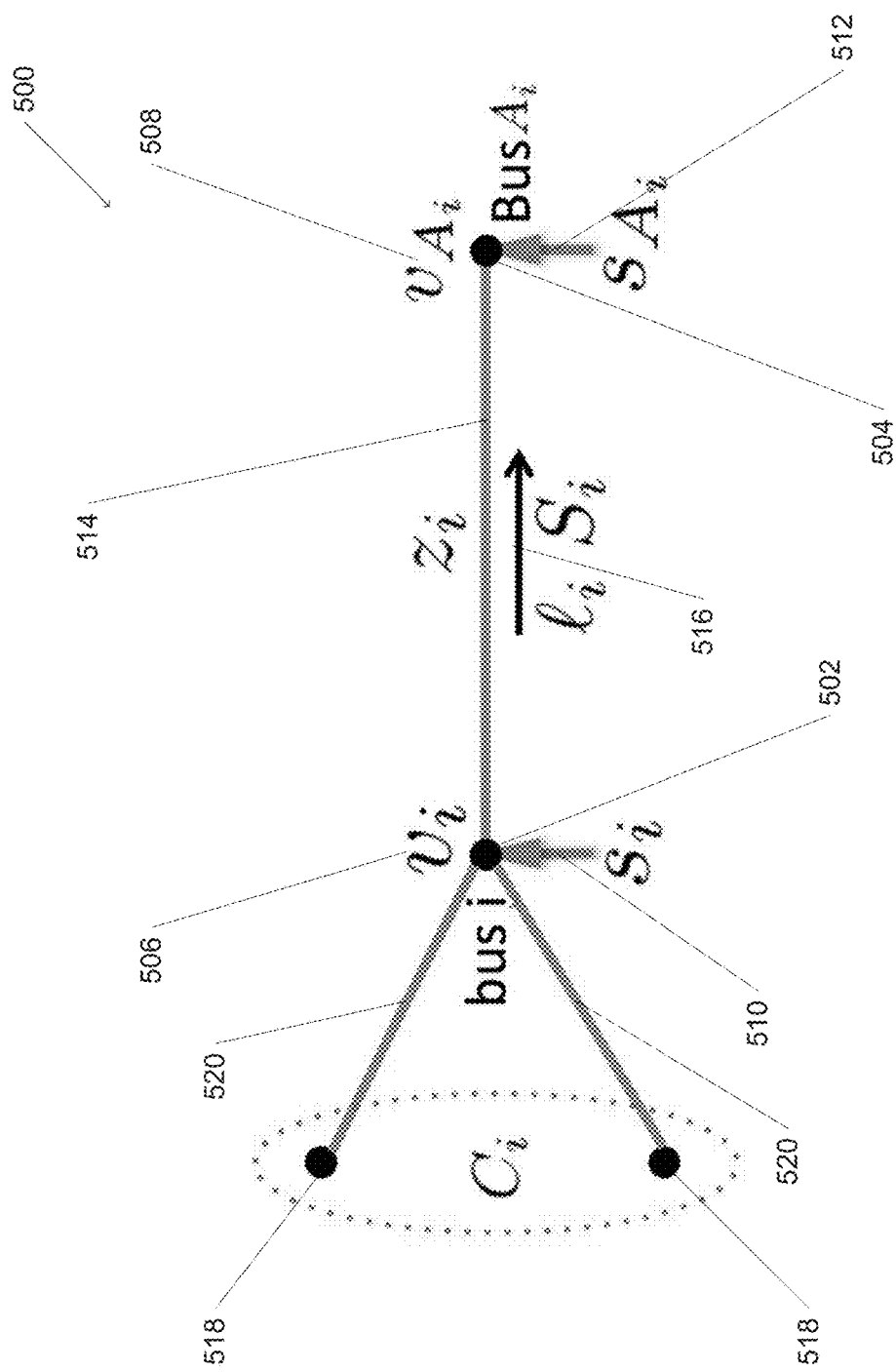
FIG. 5 is a diagram illustrating a relationship between nodes and operating parameters in a branch flow model in accordance with an embodiment of the invention.

The relationship between nodes and operating parameters in a BFM is discussed in accordance with an embodiment of the invention is shown in FIG. 5. A node 502 has a unique ancestor node 504. Node 502 and unique ancestor node 504 are connected by line 514. Both node 502 and unique ancestor node 504 have a series of operating parameters. In many embodiments of the invention, example operating parameters for node 502 include voltage 506 and power injection 510. Unique ancestor node 504 has corresponding voltage 508 and power injection 512. The line 514 also has operating parameters which for example include an impedance value as well as a current and/or power injection 516. In various embodiments, node 502 can be connected to one or more child nodes 518 by line 520. The relationship between node 502 and child node 518 is similar to the relationship between node 502 and ancestor node 504, where node 502 acts like the ancestor node. The relationship between nodes and operating values will be discussed in greater detail below. Although many operating parameters between two nodes in a BFM are described above with respect to FIG. 5, any of a variety of operating parameters can be utilized as operating parameters as appropriate to the requirements of specific applications in accordance with embodiments of the invention.

The OPF problem on unbalanced radial distribution networks will be described in greater detail below. In many embodiments OPF can be solved though SDP relaxation. In many embodiments, the set of complex numbers can be denoted with $\mathbb{C}$, the set of set of n-dimensional complex numbers can be denoted with $\mathbb{C}^n$, and the set of m×n complex matrix can be denoted with $\mathbb{C}^{m \times n}$. The set of hermitian (positive semidefinite) matrix can be denoted by $\mathbb{S}$ ($\mathbb{S}_+$). The hermitian transpose of a vector (matrix) x can be denoted by $x^H$. The trace of a square matrix $x \in \mathbb{C}^{n \times n}$ can be denoted by $tr(x) := \sum_{i=1}^{n} x_{ii}$. The inner product of two matrices (vectors) $x, y \in \mathbb{C}^{m \times n}$ can be denoted by $\langle x, y \rangle := \mathrm{Re}(tr(x^H y))$. In several embodiments, the Frobenius (Euclidean) norm of a matrix (vector) $x \in \mathbb{C}^{m \times n}$ can be defined as $\|x\|_2 := \sqrt{\langle x, x \rangle}$. $\mathrm{Diag}(x) \in \mathbb{C}^{n \times 1}$ can denote the vector composed of x's diagonal elements when given $x \in \mathbb{C}^{n \times n}$.

In several embodiments, a distribution network can be modeled by a directed tree graph $\mathcal{T} := (\mathcal{N}, E)$ where $\mathcal{N} := \{0, \ldots, n\}$ represents the set of buses (nodes) and E represents the set of distribution lines connecting the buses (nodes) in $\mathcal{N}$. The root of the tree can be indexed by 0 and in several embodiments, $\mathcal{N}_+ := \mathcal{N} \setminus \{0\}$ can denote the other buses (nodes). For each bus (node) i, there can be a unique ancestor $A_i$, and a set of children buses (nodes) which can be denoted by $C_i$. In various embodiments the graph orientation where every line points towards the root can be adopted. Each directed line connects a bus (node) i and its unique ancestor $A_i$. Hence, the lines can be labeled by $\varepsilon := \{1, \ldots, n\}$ where each $i \in \varepsilon$ denotes a line from i to $A_i$. Note that $\varepsilon = \mathcal{N}_+$ and $\mathcal{N}_+$ can be used to represent the lines set for convenience.

Figure 6:
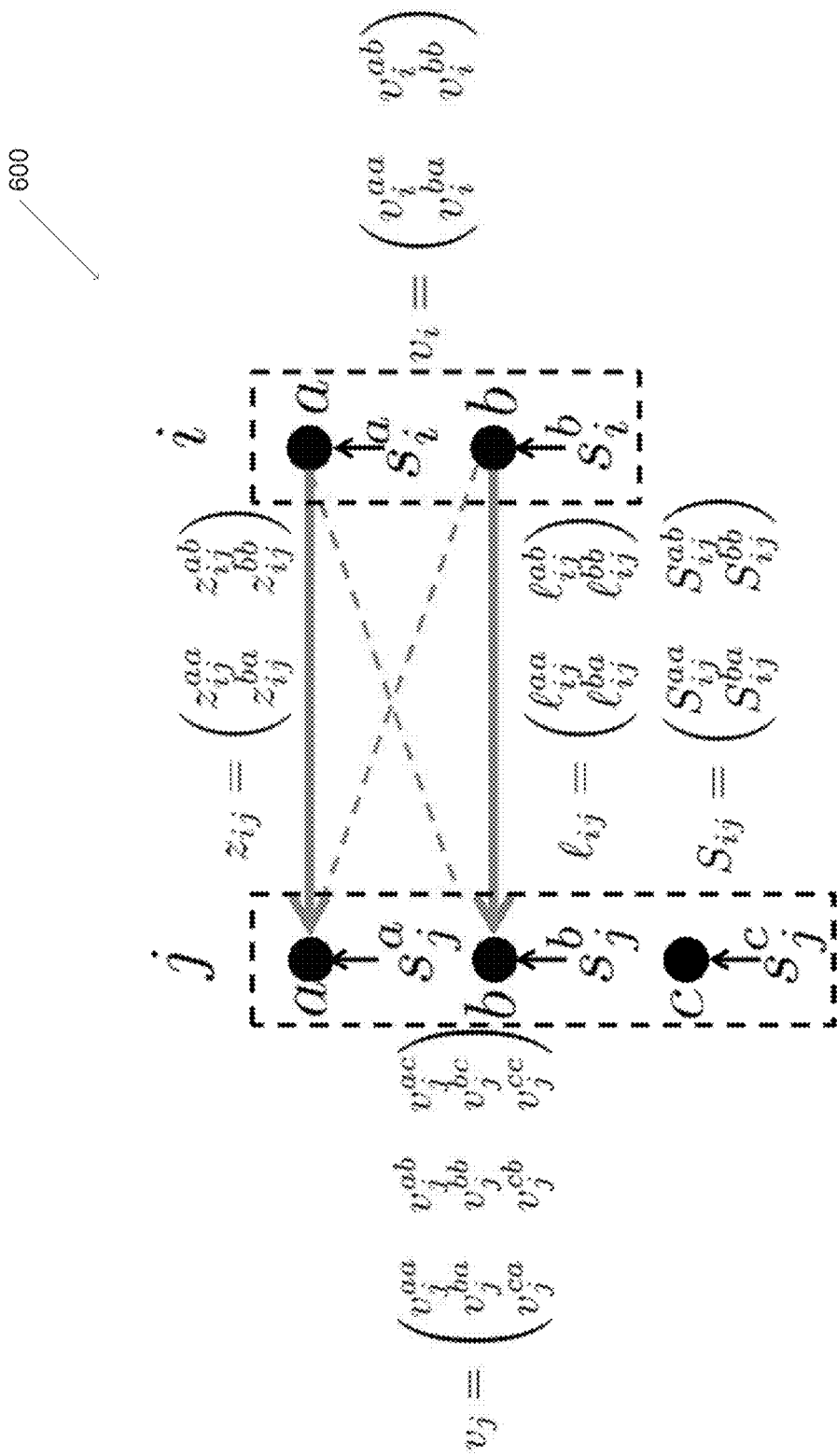
FIG. 6 is is a diagram illustrating a relationship between a two node network and operating parameters in accordance with an embodiment of the invention.

In many embodiments, a, b, c can denote the three phases of the network. For each bus (node) $i \in \mathcal{N}$, $\Phi_i \subseteq \{a,b,c\}$ can denote the set of phases. In a typical distribution network, the set of phases for bus (node) i is a subset of the phases of its parent and superset of the phases of its children. i.e. $\Phi_i \subseteq \Phi_{A_i}$ and $\Phi_j \subseteq \Phi_i$ for $j \in C_i$. On each phase $\phi \in \Phi_i$, $V_i^\phi \in \mathbb{C}$ can denote the complex voltage and $s_i^\phi := p_i^\phi + jq_i^\phi$ can denote the complex power injection. In various embodiments, let $V_i := (V_i^\phi, \phi \in \Phi_i) \in \mathbb{C}^{|\Phi_i|}$, $s_i := (s_i^\phi, \phi \in \Phi_i) \in \mathbb{C}^{|\Phi_i|}$ and $v_i := V_i^H V_i \in \mathbb{C}^{|\Phi_i| \times |\Phi_i|}$. For each line $i \in \mathcal{N}_+$ connecting bus (node) $i$ and its ancestor $A_i$, the set of phases can be $\Phi_i \cap \Phi_{A_i} = \Phi_i$ since $\Phi_i \subseteq \Phi_{A_i}$. On each phase $\phi \in \Phi_i$, let $I_i^\phi \in \mathbb{C}$ denote the complex branch current. In several embodiments, let $I_i := (I_i^\phi, \phi \in \Phi_i) \in \mathbb{C}^{|\Phi_i|}$, $l_i := I_i I_i^H \in \mathbb{C}^{|\Phi_i| \times |\Phi_i|}$ and $S_i := V_i I_i^H \in \mathbb{C}^{|\Phi_i| \times |\Phi_i|}$. Two bus (node) network 600 in accordance with an embodiment of the invention is illustrated in FIG. 6. In many embodiments, notations can include a variable without a subscript which can denote the set of variables with appropriate components, as summarized below.

| | |
|---|---|
| $v := (v_i, i \in \mathcal{N})$ | $s := (s_i, i \in \mathcal{N})$ |
| $l := (l_i, i \in \mathcal{N}_+)$ | $S := (S_i, i \in \mathcal{N}_+)$ |

In many embodiments, given a radial network $\mathcal{T}$, the branch flow model for unbalanced network can be defined by:

$$\mathcal{P}_i(v_{A_i}) = v_i - z_i S_i^H - S_i z_i^H + z_i \ell_i z_i^H \quad i \in \mathcal{N}_+ \tag{3a}$$

$$s_i = -\text{diag}\left(\sum_{i \in C_i} \mathcal{P}_i(S_j - z_j \ell_j) - S_i\right) \quad i \in \mathcal{N} \tag{3b}$$

$$\begin{pmatrix} v_i & S_i \\ S_i^H & \ell_i \end{pmatrix} \in \mathbb{S}_+ \quad i \in \mathcal{N}_+ \tag{3c}$$

$$\text{rank}\begin{pmatrix} v_i & S_i \\ S_i^H & \ell_i \end{pmatrix} = 1 \quad i \in \mathcal{N}_+ \tag{3d}$$

where $\mathcal{P}_i(v_{A_i})$ can denote projecting va, to the set of phases on bus (node) $i$ and $\mathcal{P}_i(S_j - z_j l_j)$ can denote lifting the result of $S_j - z_j l_j$ to the set of phases $\Phi_i$ and filling the missing phase with 0, e.g. if $\Phi_{A_i} = \{a,b,c\}$, $\Phi_i = \{a,b\}$ and $\Phi_j = \{a\}$, then $$\mathcal{P}_i(v_{A_i}) := \begin{pmatrix} v_{A_i}^{aa} & v_{A_i}^{ab} \\ v_{A_i}^{ba} & v_{A_i}^{bb} \end{pmatrix}$$

$$\mathcal{P}_i(S_j - z_j \ell_j) := \begin{pmatrix} S_j^{aa} - z_j^{aa} \ell_j^{aa} & 0 \\ 0 & 0 \end{pmatrix}$$

In several embodiments, given a vector $(v,s,l,S)$ that satisfies (3), it can be proved that the bus (node) voltages $V_i$ and branch currents $I_i$ can be uniquely determined if the network is a tree. Hence this model (3) can be equivalent to a full unbalanced AC power flow model.

OPF and SDP Relaxation

In many embodiments, the OPF problem seeks to optimize certain objectives. e.g. total power loss or generation cost, subject to unbalanced power flow equations (3) and various operational constraints. An objective function of the following form can be considered:

$$F(s) := \sum_{i \in \mathcal{N}} f_i(s_i) := \sum_{i \in \mathcal{N}} \sum_{\phi \in \Phi_i} f_i^\phi(s_i^\phi). \tag{4}$$

For instance, to minimize total line loss, set $\phi \in \Phi_i$, $i \in \mathcal{N}$, $$f_i^\phi(s_i^\phi) = p_i^\phi. \tag{5}$$

or in other various embodiments, to minimize generation cost, set $i \in \mathcal{N}$, $$f_i^\phi(s_i^\phi) = \left(\frac{\alpha_i^\phi}{2}(p_i^\phi)^2 + \beta_i^\phi p_i^\phi\right), \tag{6}$$

where $\alpha_i^\phi, \beta_i^\phi > 0$ depend on the load type on bus (node) $i$, e.g. $\alpha_i^\phi = 0$ and $\beta_i^\phi = 0$ for bus (node) $i$ where there is no generator and for generator bus (node) $i$, the corresponding $\alpha_i^\phi$, $\beta_i^\phi$ depends on the characteristic of the generator.

In many embodiments, for each bus (node) $i \in \mathcal{N}$, there can be two operational constraints on each phase $\phi \in \Phi_i$. First, the power injection $s_i^\phi$ is constrained to be in an injection region $\mathcal{I}_i^\phi$, i.e.

$$s_i^\phi \in \mathcal{I}_i^\phi \text{ for } \phi \in \Phi_i \text{ and } i \in \mathcal{N} \tag{7}$$

The feasible power injection region $\mathcal{I}_i^\phi$ can be determined by the controllable loads attached to phase $\phi$ on bus (node) $i$. Second, the voltage magnitude can be maintained within a prescribed region. Note that the diagonal element of $v_i$ describes the voltage magnitude square on each phase $\phi \in \Phi_i$. Thus the constraints can be written as $$\underline{v}_i^\phi \leq v_i^{\phi\phi} \leq \overline{v}_i^\phi i \in \mathcal{N} \tag{8}$$

where $v_i^{\phi\phi}$ denotes the $\phi_{th}$ diagonal element of $v_i$. Typically the voltage magnitude at substation buses (nodes) is assumed to be fixed at a prescribed value. i.e. $\underline{v}_0^\phi = \overline{v}_0^\phi$ for $\phi \in \Phi_0$. At other load buses (nodes) $i \in \mathcal{N}_+$, the voltage magnitude is typically allowed to deviate by 5% from its nominal value, i.e., $\underline{v}_i^\phi = 0.95^2$ and $\overline{v}_i^\phi = 1.05^2$ for $\phi \in \Phi_i$.

To summarize, in many embodiments the OPF problem for unbalanced radial distribution networks can be:

$$\text{OPF:} \quad \begin{array}{l} \min \sum_{i \in \mathcal{N}} \sum_{\phi \in \Phi_i} f_i^\phi(s_i^\phi) \\ \text{over} \quad v, s, S, \ell \\ \text{s.t.} \quad (3) \text{ and } (7) - (8) \end{array} \tag{9}$$

The OPF problem (9) can be nonconvex due to the rank constraint (3d). In several embodiments, an SDP relaxation for (9) can be obtained by removing the rank constraint (3d), resulting in a semidefinite program (SDP):

$$\text{ROPF:} \quad \begin{array}{l} \min \sum_{i \in \mathcal{N}} \sum_{\phi \in \Phi_i} f_i^\phi(s_i^\phi) \\ \text{over} \quad v, s, S, \ell \\ \text{s.t.} \quad (3a) - (3c) \text{ and } (7) - (8) \end{array} \tag{10}$$

In many embodiments, the relaxation ROPF (10) provides a lower bound for the original OPF problem (9) since the original feasible set is enlarged. The relaxation can be called exact if every optimal solution of ROPF satisfies the rank constraint (3d) and hence can also be optimal for the original OPF problem. Distributed processes to solve optimal power flow in an unbalanced network are described below.

Solving for OPF

Figure 7:
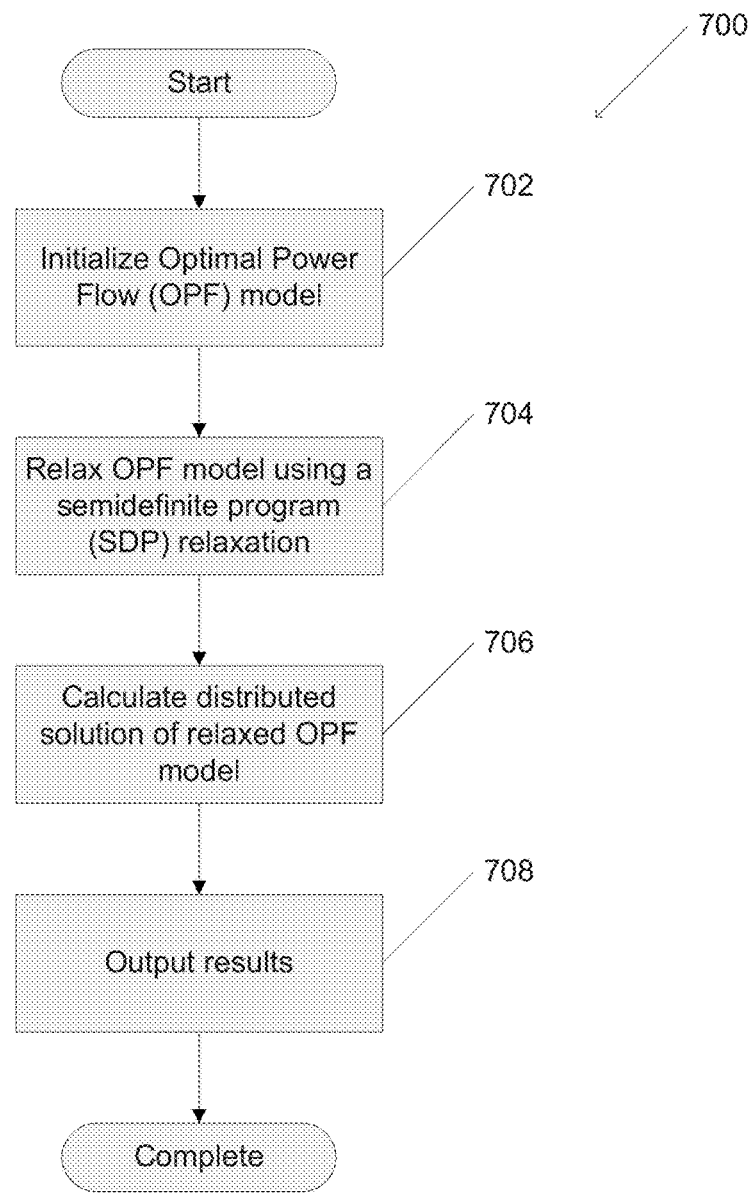
FIG. 7 is a flow chart illustrating a process to solve for optimal power flow on an unbalanced power distribution network in accordance with an embodiment of the invention.

An overview of a process for solving for optimal power flow in an unbalanced radial network utilizing a distributed solution is illustrated in FIG. 7. The OPF model is initialized 702. The nonconvex model is relaxed 704 using a semidefinite program relaxation. A distributed solution of a relaxed OPF is calculated 706. In many embodiments, this distributed solution can be either a closed form expression or an eigen-distribution of a hermitian matrix. Finally, results are generated 708. A detailed discussion of the process follows.

Figure 8:
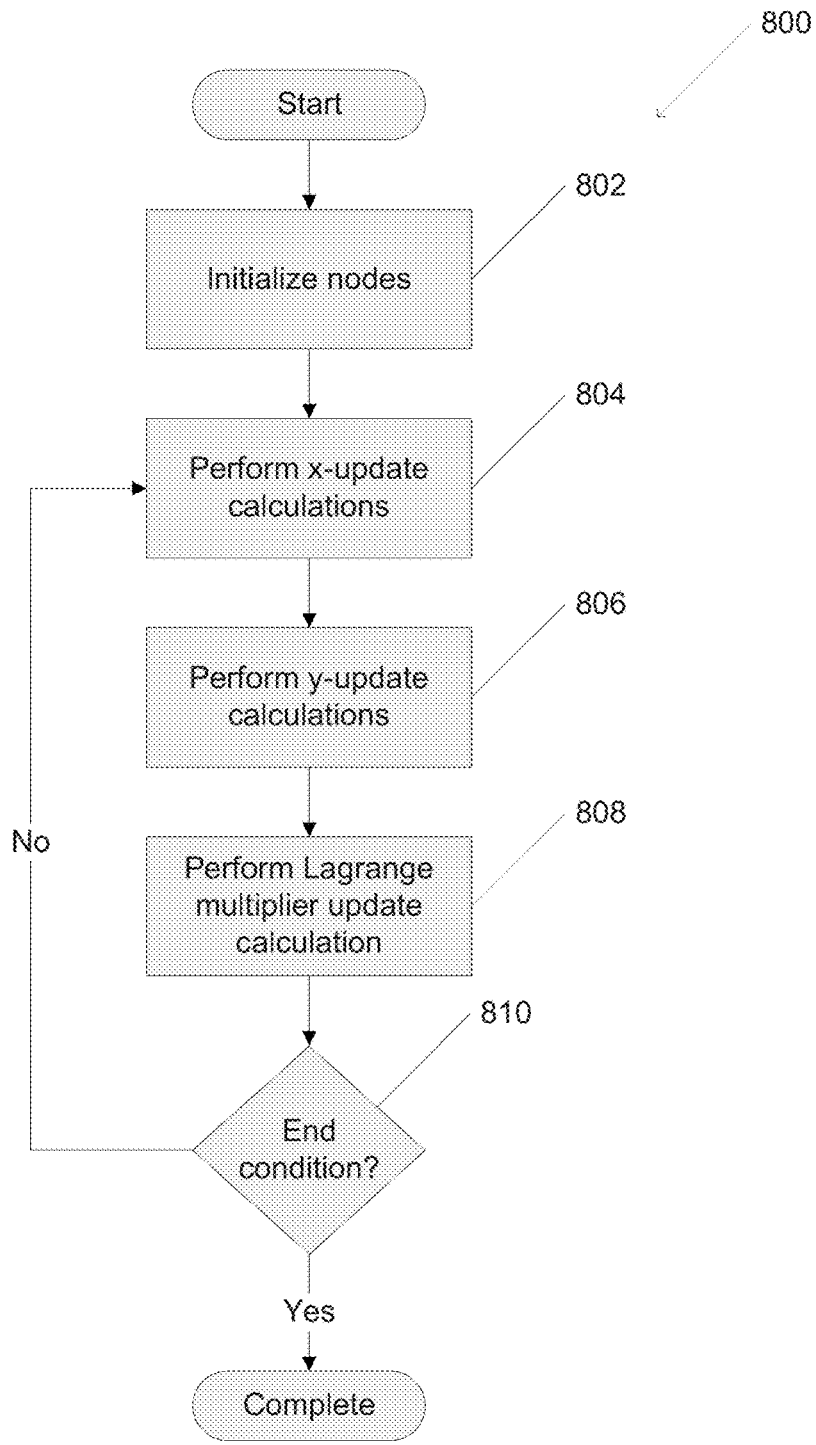
FIG. 8 is a flow chart illustrating a process to solve for optimal power flow using alternating direction method of multipliers in an iterative solution in accordance with an embodiment of the invention.

An overview of the ADMM process to solve for OPF, where each distributed calculation involves evaluation of either closed form solutions or an eigen-distribution of a hermitian matrix is illustrated in FIG. 8. Nodes are initialized 802 prior to performing 804 the x-update calculation. Pseudocode for a process to initialize nodes similar to node initialization 804 is described below with respect to FIG. 11. To perform the x-update calculation, a node will request required operating parameters from its ancestor and children nodes to enable performing this calculation. The remaining calculations do not require communication with neighboring nodes. The y-update calculation is performed 806, and then the Lagrange multiplier update is calculated 808. The end condition is checked 810. If the end condition has not been satisfied, the ADMM process begins performing the x-update calculation again. Otherwise, the process is complete. Although the process of ADMM is described with reference to FIG. 8, any of a variety of ADMM variants can be utilized as appropriate to the requirements of specific applications in accordance with embodiments of the invention. A detailed discussion of each of the update steps utilized in ADMM process similar to those described above with reference to FIG. 8 follows. Obtaining closed form expressions or an eigen-distribution of a hermitian matrix for each of the update steps utilized in the distributed processes involves rewriting the relaxed OPF problem in a manner that lends itself to solving as a series of subproblems.

In many embodiments, it can be assumed that the SPD relaxation is exact. A distributed process that solves the ROPF problem follows. A distributed process for a broad class of optimization problems can be developed through alternating direction method of multipliers (ADMM). The process can be applied to the ROPF problem, and it can be shown that the optimization subproblems can be solved efficiently either through closed form solutions or eigen-decomposition of a 6×6 matrix.

ADMM

ADMM blends the decomposability of dual decomposition with the superior convergence properties of the method of multipliers. It can solve optimization problems of the form:

$$\min_{x,y} \quad f(x) + g(y) \tag{11}$$
$$\text{s.t.} \quad x \in \mathcal{K}_x, \, y \in \mathcal{K}_y$$
$$x = y$$

where $f(x), g(y)$ are convex functions and $\mathcal{K}_x, \mathcal{K}_y$ are convex sets. Let $\lambda$ denote the Lagrange multiplier for the constraint x=y. Then the augmented Lagrangian is defined as $$L_\rho(x, y, \lambda) := f(x) + g(y) + \langle \lambda, x - y \rangle + \frac{\rho}{2} \|x - y\|_2^2, \tag{12}$$

where $\rho \geq 0$ is a constant. When $\rho=0$, the augmented Lagrangian degenerates to the standard Lagrangian. At each iteration k, ADMM consists of the iterations:

$$x^{k+1} \in \arg\min_{x \in \mathcal{K}_x} L_\rho(x, y^k, \lambda^k) \tag{13a}$$

$$y^{k+1} \in \arg\min_{x \in \mathcal{K}_y} L_\rho(x^{k+1}, y, \lambda^k) \tag{13b}$$

$$\lambda^{k+1} = \lambda^k + \rho(x^{k+1} - y^{k+1}). \tag{13c}$$

Specifically, at each iteration, ADMM first updates x based on (13a), then updates y based on (13b), and after that updates the multiplier $\lambda$ based on (13c). Compared to dual decomposition. ADMM is guaranteed to converge to an optimal solution under less restrictive conditions. Let $$r^k := \|x^k - y^k\|_2 \tag{14a}$$

$$s^k := \rho \|y^k - y^{k-1}\|_2, \tag{14b}$$

which can be viewed as the residuals for primal and dual feasibility, respectively. They converge to 0 at optimality and are usually used as metrics of convergence in the experiment.

Figure 9:
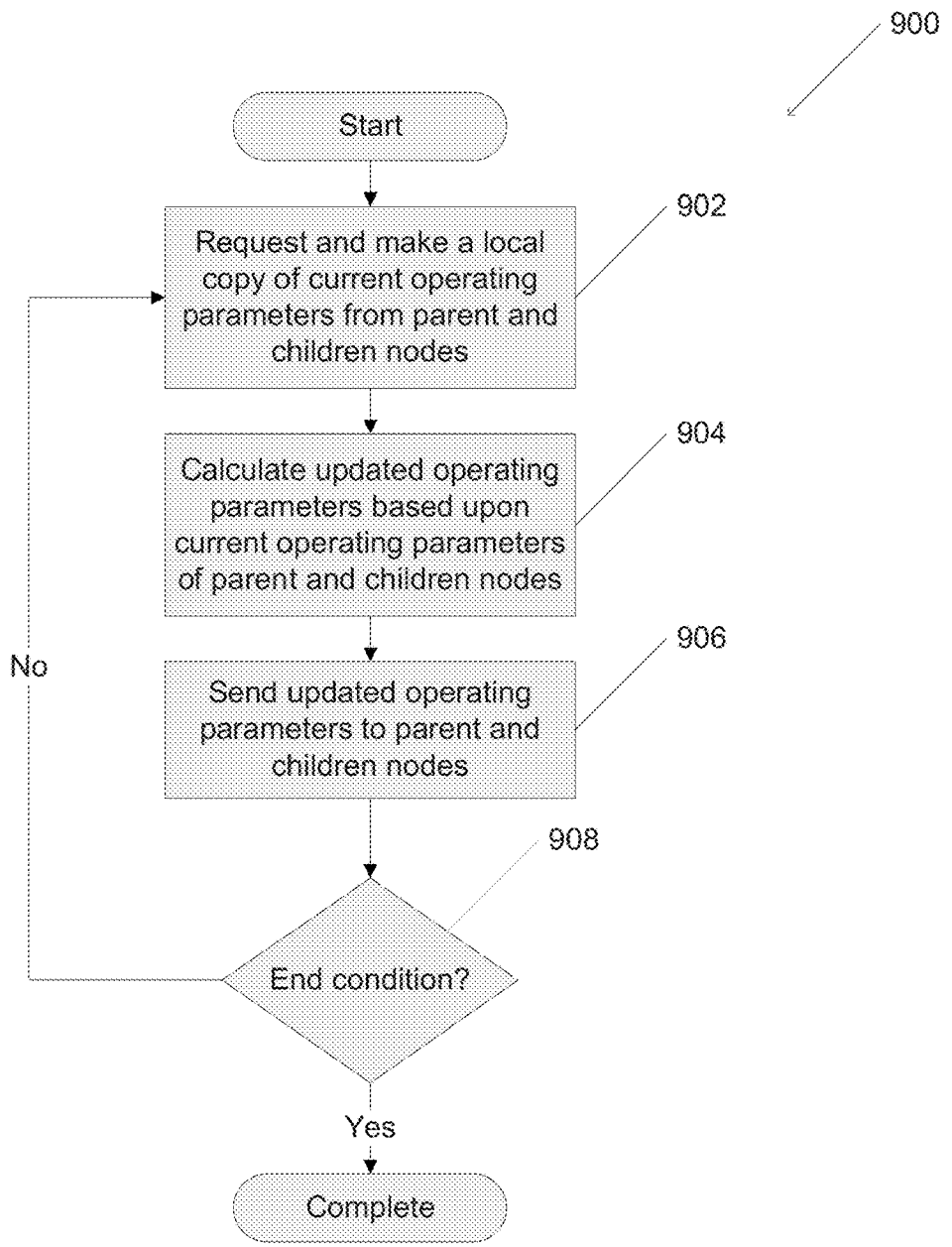
FIG. 9 is a flow chart illustrating a process for a node to perform a distributed power control application in accordance with an embodiment of the invention.
Figure 10B:
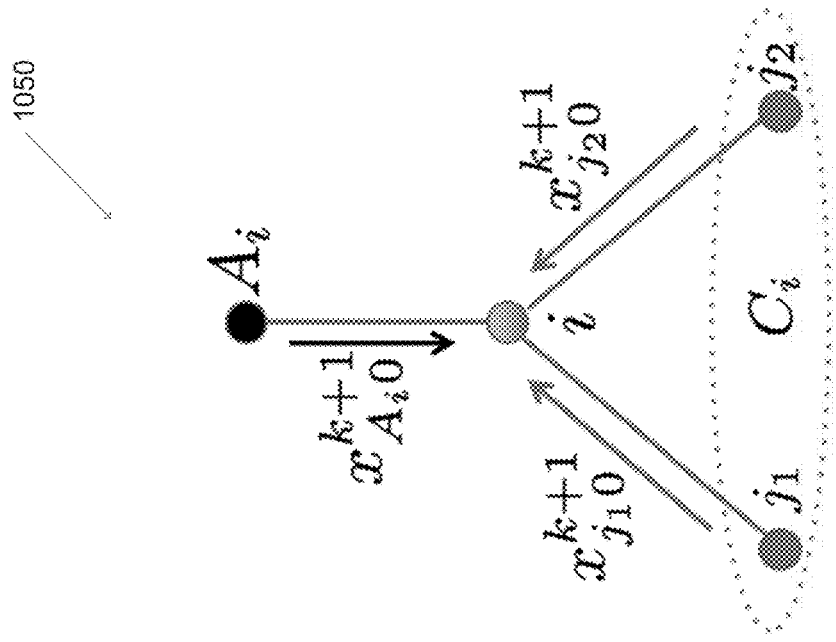
FIGS. 10A-10B are diagrams illustrating a set of nodes before and after an x-update step, respectively, in accordance with an embodiment of the invention.
Figure 10A:
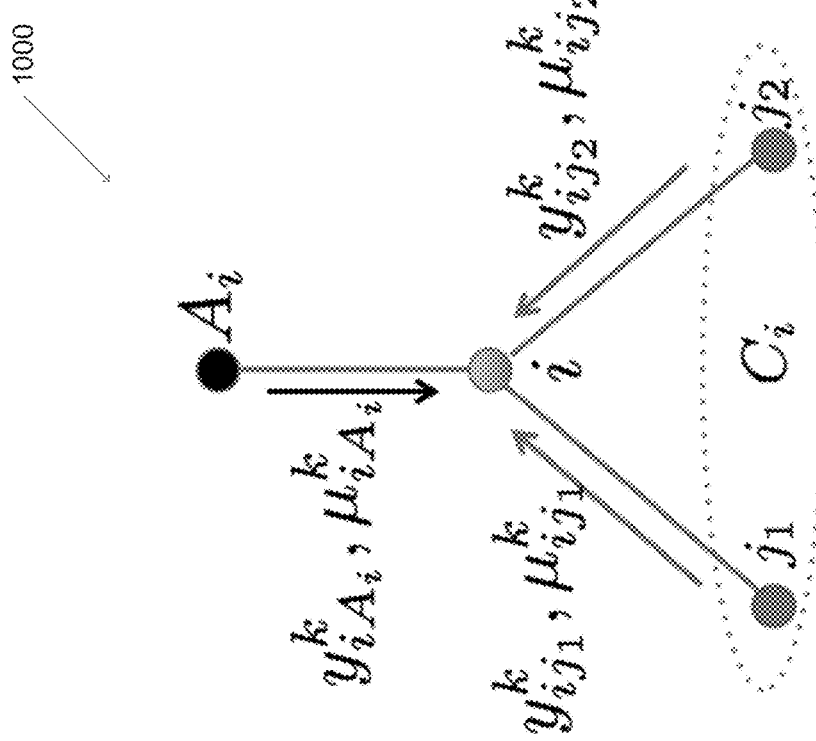

Referring back to FIG. 8, the process performed by node controllers in accordance with many embodiments of the invention involves performing the x-update calculation 804, the z-update calculation 806, and the Lagrange multiplier update 808 until an end condition is reached 810. As noted above, the calculations performed in each of the x-update, y-update, and Lagrange multiplier update calculations involve the evaluation of closed form expressions or eigen-decomposition of a 6×6 matrix. The information exchange that occurs during the update calculations is illustrated in FIGS. 9, 10A and 10B. A node requests and makes local copies 902 of current operating parameters from its ancestor and children nodes. Updated operating parameters are calculated 904 based upon current operating parameters of ancestor and children nodes. After this calculation is performed, the updated operating parameters are sent 906 to ancestor and children nodes. The end condition is checked 908 and if it has not been met the process begins again by requesting and making local 902 copies of current operating parameters from ancestor and children nodes. Otherwise the process is complete and it ends. The specific operating parameters passed between nodes and their ancestors and/or children nodes before and after the x-update process is illustrated in FIGS. 10A and 10B. As can readily be appreciated, additional communication and/or information can occur between nodes during the execution of the distributed processes by the node controllers.

The below discussion provides a detailed explanation of the manner in which closed form solutions or eigen-decomposition of a 6×6 matrix solution can be developed for subproblems that can be solved by individual node controllers to achieve a distributed solution to achieve OPF in a radial power distribution network. The manner in which the solutions outlined in the above discussion can be utilized to implement processes that are executed in node controllers in accordance with various embodiments of the invention is discussed further below.

In many embodiments, the above ADMM process can be generalized such that the optimization subproblems can be solved efficiently for the ROPF problem. Instead of using the quadratic penalty term $\rho/2 \|x-y\|_2^2$ in (12), a more general quadratic penalty term can be used: $\|x-y\|_\Lambda^2$, where $\|x-y\|_\Lambda^2 := (x-y)^H \Lambda (x-y)$ and $\Lambda$ is a positive diagonal matrix. In many embodiments the augmented Lagrangian becomes $$L_\rho(x, y, \lambda) := f(x) + g(y) + \langle \lambda, x - y \rangle + \frac{\rho}{2}\|x - y\|_\Lambda^2. \tag{15}$$

The convergence result can carry over directly to this general case.

Distributed ADMM Processes

A distributed ADMM process for a broad class of optimization problems can be developed, of which the ROPF problem can be a special case. Consider the following optimization problem:

$$\min \sum_{i \in \mathcal{N}} f_i(x_i) \tag{16a}$$

$$\text{over } \{x_i \mid i \in \mathcal{N}\} \tag{16b}$$

$$\text{s.t.} \sum_{j \in N_i} A_{ij} x_i = 0 \text{ for } i \in \mathcal{N} \tag{16c}$$

$$x_i \in \bigcap_{r=0}^{R_i} \mathcal{K}_{ir} \text{ for } i \in \mathcal{N}, \tag{16d}$$

where for each $i \in \mathcal{N}$, $x_i$ can be a complex vector, $f_i(x_i)$ can be a convex function, $\mathcal{K}_{ir}$ can be a convex set, and $A_{ij}$ ($j \in N_i$, $i \in \mathcal{N}$) can be matrices with appropriate dimensions. In many embodiments, a broad class of graphical optimization problems (including ROPF) can be formulated as (16). Each node $i \in \mathcal{N}$ can be associated with some local variables stacked as $x_i$, which belongs to an intersection of $R_i+1$ local feasible sets $\mathcal{K}_{ir}$ and has a cost objective function $f_i(x_i)$. Variables in node i can be coupled with variables from their neighbor nodes in $N_i$ through linear constraints (16c). The objective can then be to solve a minimal total cost across all the nodes.

In various embodiments, a distributed process that solves (16) can be developed such that each node i solves its own subproblem and only exchanges information with its neighbor nodes $N_i$. In order to transform (16) into the form of ADMM (11), two sets of variables x and y can be used. In many embodiments, two sets of slack variables can be utilized:

1. $x_{ir}$ can represent a copy of the original variable $x_i$ for $1 \le r \le R_i$. For convenience, denote the original $x_i$ by $x_{i0}$.
2. $y_{ij}$ can represent the variables in node i observed at node j, for $j \in N_i$.

In various embodiments, (16) can be reformulated as $$\min \sum_{i \in \mathcal{N}} f_i(x_{i0}) \tag{17a}$$

$$\text{over } x = \{x_{ir} \mid 0 \le r \le R_i, i \in \mathcal{N}\}$$
$$y = \{y_{ij} \mid j \in N_i, i \in \mathcal{N}\}$$

$$\text{s.t.} \sum_{j \in N_i} A_{ij} y_{ji} = 0 \text{ for } i \in \mathcal{N} \tag{17b}$$

$$x_{ir} \in \mathcal{K}_{ir} \text{ for } 0 \le r \le R_i, i \in \mathcal{N} \tag{17c}$$

$$x_{ir} \in y_{ii} \text{ for } 1 \le r \le R_i, i \in \mathcal{N} \tag{17d}$$

$$x_{i0} = y_{ij} \text{ for } j \in N_i, i \in \mathcal{N}, \tag{17e}$$

where x and y represent the two groups of variables in ADMM. Note that the consensus constraints (17d) and (17e) can force all the duplicates $x_{ir}$ and $y_{ij}$ to be the same. Thus its solution $x_{i0}$ can also be optimal to the original problem (16). (17) can fall into the general ADMM form (11), where (17b) corresponds to $\mathcal{K}_y$, (17c) corresponds to $\mathcal{K}_x$, and (17d) and (17e) are the consensus constraints that relates x and y.

Following the ADMM procedure, the consensus constraints can be relaxed (17d) and (17e), whose Lagrangian multipliers are denoted by $\lambda_{ir}$ and $\mu_{ij}$, respectively. The generalized augmented Lagrangian then can be written as $$L_\rho(x, y, \lambda, \mu) = \sum_{i \in \mathcal{N}} \left( \sum_{r=1}^{R_i} \left( \langle \lambda_{ir}, x_{ir} - y_{ii} \rangle + \frac{\rho}{2}\|x_{ir} - y_{ii}\|_{\Lambda_{ir}}^2 \right) + \right.$$
$$\left. f_i(x_{i0}) + \sum_{j \in N_i} \left( \langle \mu_{ij}, x_{i0} - y_{ij} \rangle + \frac{\rho}{2}\|x_{i0} - y_{ij}\|_{M_{ij}}^2 \right) \right). \tag{18}$$

where the parameter $\Lambda_{ir}$ and $M_{ij}$ depend on the process describe further below.

In several embodiments, it can be shown that both the x-update (13a) and y-update (13b) can be solved in a distributed manner, i.e. both of them can be decomposed into local subproblems that can be solved in parallel by each node i with only neighborhood communications.

A set of local variables can be defined for each node i, denoted by $\mathcal{A}_i$, which includes its own duplicates $x_{ir}$ and the associated multiplier $\lambda_{ir}$ for $0 \le r \le R_i$, and the "observations" $y_{ji}$ of variables from its neighbor $N_i$ and the associated multiplier $\mu_{ji}$, i.e.

$$\mathcal{A}_i := \{x_{ir}, \lambda_{ir} \mid 0 \le r \le R_i\} \cup \{y_{ji}, \mu_{ji} \mid j \in N_i\}. \tag{19}$$

It can be shown how each node i can update $\{x_{ir} \mid 0 \le r \le R_i\}$ in the x-update and $\{y_{ji} \mid j \in N_i\}$ in the y-update.

In the x-update at each iteration k, the optimization subproblem that updates $x^{k+1}$ can be $$\min_{x \in \mathcal{K}_x} L_\rho(x, y^k, \lambda^k, \mu^k), \tag{20}$$

where the constraint $\mathcal{K}_x$ is the Cartesian product of $\mathcal{K}_{ir}$, i.e. $\mathcal{K}_x := \otimes_{i \in \mathcal{N}} \otimes_{r=0}^{R_i} \mathcal{K}_{ir}$.

The objective can be written as a sum of local objectives as shown below $$L_\rho(x, y^k, \lambda^k, \mu^k) = \sum_{i \in \mathcal{N}} \left( \sum_{r=1}^{R_i} \left( \langle \lambda_{ir}^k, x_{ir} - y_{ii}^k \rangle + \frac{\rho}{2}\|x_{ir} - y_{ii}^k\|_{\Lambda_{ir}}^2 \right) + \right.$$
$$\left. f_i(x_{i0}) + \sum_{j \in N_i} \left( \langle \mu_{ij}^k, x_{i0} - y_{ij}^k \rangle + \frac{\rho}{2}\|x_{i0} - y_{ij}^k\|_{M_{ij}}^2 \right) \right) =$$
$$\sum_{i \in \mathcal{N}} \sum_{r=0}^{R_i} H_{ir}(x_{ir}) - \sum_{i \in \mathcal{N}} \left( \sum_{r=0}^{R_i} \langle \lambda_{ir}^k, y_{ii}^k \rangle + \sum_{j \in N_i} \langle \mu_{ij}^k, y_{ij}^k \rangle \right),$$

where the last term is independent of x and $$H_{ir}(x_{ir}) = \begin{cases} f_i(x_{i0}) + \sum_{j \in N_i} \left( \langle \mu_{ij}^k, x_{i0} \rangle + \frac{\rho}{2}\|x_{i0} - y_{ij}^k\|_{M_{ij}}^2 \right) & r = 0 \\ \langle \lambda_{ir}^k, x_{ir} \rangle + \frac{\rho}{2}\|x_{ir} - y_{ii}^k\|_{\Lambda_{ir}}^2 & r > 0 \end{cases} \tag{21}$$

In many embodiments, the problem (20) in the x-update can be written explicitly as $$\min \sum_{i \in \mathcal{N}} \sum_{r=0}^{R_i} H_{ir}(x_{ir}) \quad (22)$$

over $x = \{x_{ir} \mid 0 \le r \le R_i, i \in \mathcal{N}\}$ s.t. $x_{ir} \in \mathcal{K}_{ir}$ for $0 \le r \le R_i, i \in \mathcal{N}$, where both the objective and constraint are separable for $0 \le r \le R_i$ and $i \in \mathcal{N}$. Thus it can be decomposed into $\Sigma_{i \in \mathcal{N}}(R_i+1)$ independent problems that can be solved in parallel. There are $R_i+1$ problems associated with each node $i$ and the $r_{th}$ ($0 \le r \le R_i$) one can be simply written as $$\min_{x_{ir} \in \mathcal{K}_{ir}} H_{ir}(x_{ir}) \quad (23)$$

whose solution is the new update of variables $x_{ir}$ for node $i$. In the above problem, the constants $y_{ij}^k, \mu_{ij}^k \in \mathcal{A}_j$ are not local to $i$ and stored in $i$'s neighbors $j \in N_i$. Therefore, each node $i$ needs to collect $(y_{ij}, \mu_{ij})$ from all of its neighbors prior to solving (23). The message exchanges are illustrated in FIG. 10A.

In the y-update, the optimization problem that updates $y^{k+1}$ can be $$\min_{y \in \mathcal{K}_y} L_\rho(x^{k+1}, y, \lambda^k, \mu^k) \quad (24)$$

where the constraint set $\mathcal{K}_y$ can be represented as a Cartesian product of $|\mathcal{N}|$ disjoint sets, i.e.

$$\mathcal{K}_y := \bigotimes_{i \in \mathcal{N}} \left\{ y_{ji}, j \in N_i \mid \sum_{j \in N_i} A_{ij} y_{ji} = 0 \right\}.$$

The objective can be written as a sum of local objectives as below.

$$L_\rho(x, y^k, \lambda^k, \mu^k) =$$

$$\sum_{i \in \mathcal{N}} \left( \sum_{r=1}^{R_i} \left( \langle \lambda_{ir}^k, x_{ir}^{k+1} - y_{ii} \rangle + \frac{\rho}{2} \| x_{ir}^{k+1} - y_{ii} \|_{\Lambda_{ir}}^2 \right) + f_i(x_{i0}^{k+1}) + \right.$$

$$\left. \sum_{j \in N_i} \left( \langle \mu_{ji}^k, x_{j0}^{k+1} - y_{ji} \rangle + \frac{\rho}{2} \| x_{j0}^{k+1} - y_{ji} \|_{M_{ji}}^2 \right) \right) =$$

$$\sum_{i \in \mathcal{N}} G_i(\{y_{ji} \mid j \in N_i\}) + \sum_{i \in \mathcal{N}} \left( f_i(x_{i0}^{k+1}) + \sum_{r=0}^{R_i} \langle \lambda_{ir}^k, x_{ir}^{k+1} \rangle + \sum_{j \in N_i} \langle \mu_{ji}^k, y_{j0}^k \rangle \right),$$

where the last term is independent of y and $$G_i(\{y_{ji} \mid j \in N_i\}) =$$

$$\sum_{r=1}^{R_i} \left( -\langle \lambda_{ir}^k, y_{ii} \rangle + \frac{\rho}{2} \| x_{ir}^{k+1} - y_{ii} \|_{\Lambda_{ir}}^2 \right) + \sum_{j \in N_i} \left( -\langle \mu_{ji}^k, y_{ji} \rangle + \frac{\rho}{2} \| x_{j0}^{k+1} - y_{ji} \|_{M_{ji}}^2 \right).$$

In various embodiments, the problem (24) in the y-update can be written explicitly as $$\min \sum_{i \in \mathcal{N}} G_i(\{y_{ji} \mid j \in N_i\})$$

over $y = \{\{y_{ji} \mid j \in N_i\} \mid i \in \mathcal{N}\}$ s.t. $\sum_{j \in N_i} A_{ij} y_{ji} = 0, i \in \mathcal{N}$ which can be decomposed into $|\mathcal{N}|$ subproblems and the subproblem for node $i$ is $$\min G_i(\{y_{ji} \mid j \in N_i\}) \quad (25)$$

over $y = \{y_{ji} \mid j \in N_i\}$ s.t. $\sum_{j \in N_i} A_{ij} y_{ji} = 0,$ whose solution is the new update of $\{y_{ji} \mid j \in N_i\} \in \mathcal{A}_i$. In (25), the constants $x_{j0} \in \mathcal{A}_j$ are stored in $i$'s neighbor $j \in N_i$. Hence, each node $i$ needs to collect $x_{j0}$ from all of its neighbor prior to solving (25). The message exchanges in the y-update is illustrated in FIG. 10B.

The problem (25) can be solved with closed form solution. The real and imaginary part of the variables $\{y_{ji} \mid j \in N_i\}$ can be stacked in a vector with appropriate dimensions and can denoted as $\tilde{y}$. Then (25) can take the following form:

$$\min \frac{1}{2} \tilde{y}^T M \tilde{y} + c^T \tilde{y} \quad (26)$$

over $\tilde{y}$ s.t. $\tilde{A} \tilde{y} = 0,$ where M is a positive diagonal matrix, $\tilde{A}$ is a full row rank real matrix, and c is a real vector. M,c,A are derived from (25). There exists a closed form expression for (26) given by $$\tilde{y} = (M^{-1} \tilde{A}^T (\tilde{A} M^{-1} \tilde{A}^T)^{-1} \tilde{A} M^{-1} - M^{-1}) c. \quad (27)$$

In summary, the original problem (16) is decomposed into local subproblems that can be solved in a distributed manner using ADMM. At each iteration, each node $i$ solves (23) in the x-update and (26) in the y-update. There exists a closed form solution to the subproblem (26) in the y-update as shown in (27), and hence whether the original problem (16) can be solved efficiently in a distributed manner depends on the existence of efficient solutions to the subproblems (23) in the x-update, which depends on the realization of both the objectives $f_i(x_i)$ and the constraint sets $\mathcal{K}_{ir}$.

Next, it can be shown the ROPF problem (10) is a special case of (16), and hence can be solved in a distributed manner using the above method. In particular, it can be shown that the corresponding subproblems in the x-update can be solved efficiently.

ADMM Applied to the OPF Problem

In various embodiments, the SDP relaxation can be assumed to be exact. A distributed algorithm for solving ROPF (10) can be derived. Using the ADMM based process developed above, the global ROPF problem can be decomposed into local subproblems that can be solved in a distributed manner with only neighborhood communication. Note that the subproblems in the y-update for each node i can always be solved with closed form solution, and therefore an efficient solution for the for the subproblems (23) in the x-update for the ROPF problem is needed. In particular, a sufficient condition can be provided for the existence of efficient solutions to all the optimization subproblems. Compared with existing methods that use generic iterative optimization solver to solve each subproblem, the computation time is improved by more than 100 times.

The ROPF problem defined in (10) can be written explicitly as $$\min \sum_{i \in \mathcal{N}} \sum_{\phi \in \Phi_i} f_i^\phi(s_i^\phi) \quad (28a)$$

over $v, s, S, \ell$ s.t. $\mathcal{P}_i(v_{A_i}) = v_i - z_i S_i^H - S_i z_i^H + z_i \ell_i z_i^H \; i \in \mathcal{N}$ (28b)

$s_i = -\text{diag}\left(\sum_{j \in C_i} \mathcal{P}_i(S_j - z_j \ell_j) - S_i\right) i \in \mathcal{N}$ (28c)

$\begin{pmatrix} v_i & S_i \\ S_i^H & \ell_i \end{pmatrix} \in \mathbb{S}_+ \; i \in \mathcal{N}$ (28d)

$s_i^\phi \in \mathcal{T}_i^\phi \phi \in \Phi_i, i \in \mathcal{N}$ (28e)

$\underline{v}_i^\phi \leq v_i^{\phi\phi} \leq \overline{v}_i^\phi \phi \in \Phi_i, i \in \mathcal{N}$ (28f)

Denote $x_i := \{v_i, s_i, S_i, \ell_i\}$ (29)

$\mathcal{K}_{i0} := \left\{ x_i \middle| \begin{pmatrix} v_i & S_i \\ S_i^H & \ell_i \end{pmatrix} \in \mathbb{S}_+, \{s_i^\phi \in \mathcal{T}_i^\phi \mid \phi \in \Phi_i\} \right\}$ (30)

$\mathcal{K}_{i1} := \{x_i \mid \underline{v}_i^\phi \leq v_i^{\phi\phi} \leq \overline{v}_i^\phi, \phi \in \Phi_i\}$ (31)

Then (28) can take the form of (16) with $R_i=1$ for all $i \in \mathcal{N}$, where (28b)-(28c) correspond to (16c) and (28d)-(28f) correspond to (16d). A sufficient condition for the existence of an efficient solution to (23) can be proven.

Recall that there is always a closed form solution to the optimization subproblem (25) in the y-update, if the objective function $f_i^\Phi$ ($s^\Phi$) and injection region $\mathcal{I}_i^\Phi$ satisfy the sufficient conditions, and all the subproblems can be solved efficiently.

Following the procedure described above, two sets of slack variables can be introduced: $x_{ir}$ and $y_{ij}$. Then the counterpart of (17) can be $$\min \sum_{i \in \mathcal{N}} \sum_{\phi \in \Phi_i} f_i^\phi\left((s_{i0}^\phi)^{(x)}\right) \quad (32a)$$

over $x := \{x_{ir} \mid 0 \leq r \leq 1, i \in \mathcal{N}\}$ $y := \{y_{ji} \mid j \in N_i, i \in \mathcal{N}\}$ s.t. $\mathcal{P}_i(v_{A_i}^{(y)}) = v_{ii}^{(y)} - z_i(S_{ii}^{(y)})^H - S_{ii}^{(y)} z_i^H + z_i \ell_{ii}^{(y)} z_i^H \; i \in \mathcal{N}$ (32b)

$s_{ii}^{(y)} = -\text{diag}\left(\sum_{j \in C_i} \mathcal{P}_i(S_{ji}^{(y)} - z_j \ell_{ji}^{(y)}) - S_{ii}^{(y)}\right) i \in \mathcal{N}$ (32c)

$\begin{pmatrix} v_{i0}^{(x)} & S_{i0}^{(x)} \\ (S_{i0}^{(x)})^H & \ell_{i0}^{(x)} \end{pmatrix} \in \mathbb{S}_+ \; i \in \mathcal{N}$ (32d)

$(s_{i0}^\phi)^{(x)} \in \mathcal{T}_i^\phi \phi \in \Phi_i$ and $i \in \mathcal{N}$ (32e)

$\underline{v}_i^\phi \leq (v_{i1}^{\phi\phi})^{(x)} \leq \overline{v}_i^\phi$ (32f)
$\phi \in \Phi_i$ and $i \in \mathcal{N}$ $x_{ir} - y_{ii} = 0$ (32g)
$r = 1$ and $i \in \mathcal{N}$ $x_{i0} - y_{ij} = 0$ (32h)
$j \in N_i$ and $i \in \mathcal{N}$, where superscript $(\cdot)^{(x)}$ and $(\cdot)^{(y)}$ can be put on each variable to denote whether the variable is updated in the x-update or y-update step. Note that each node i does not need full information of its neighbor. In many embodiments each node i, only voltage information $v_{A_i}^{(y)}$ is needed from its parent $A_i$ and branch power $S_{ji}^{(y)}$ and current $l_{ji}^{(y)}$ information from its children $j \in C_i$ based on (32). Thus, $y_{ij}$ can contains only partial information about $x_{i0}$, i.e.

$$y_{ij} := \begin{cases} (S_{ii}^{(y)}, \ell_{ii}^{(y)}, v_{ii}^{(y)}, s_{ii}^{(y)}) & j = i \\ (S_{iA_i}^{(y)}, \ell_{iA_i}^{(y)}) & j = A_i \\ (v_{ij}^{(y)}) & j \in C_i \end{cases}.$$

On the other hand, only $x_{i0}$ needs to hold all the variables and it suffices for $x_{i1}$ to only have a duplicate of $v_i$, i.e.

$$x_{ir} := \begin{cases} (S_{i0}^{(x)}, \ell_{i0}^{(x)}, v_{i0}^{(x)}, s_{i0}^{(x)}) & r = 0 \\ (v_{i1}^{(x)}) & r = i \end{cases}.$$

As a result, $x_{ir}$, $y_{ii}$ in (32g) and $x_{i0}$, $y_{ij}$ in (32h) may not consist of the same components. Notations can be abused in both (32g) and (32h), which are composed of components that appear in both items, i.e.

$$x_{i0} - y_{ij} := \begin{cases} (S_{i0}^{(x)} - S_{ii}^{(y)}, \ell_{i0}^{(x)} - \ell_{ii}^{(y)}, v_{i0}^{(x)} - v_{ii}^{(y)}, s_{i0}^{(x)} - s_{ii}^{(y)}) & j = i \\ (S_{i0}^{(x)} - S_{iA}^{(y)}, \ell_{i0}^{(x)} - \ell_{iA_i}^{(y)}) & j = A_i \\ (v_{i0}^{(x)} - v_{ij}^{(y)}) & j \in C_i \end{cases}$$

$x_{ir} - y_{ii} := \left\{ (v_{i1}^{(x)} - v_{ii}^{(y)}) \; r = 1 \right..$

Let $\lambda$ denote the Lagrangian multiplier for (32g) and $\mu$ the Lagrangian multiplier for (32g). The detailed mapping between constraints and those multipliers are illustrated in FIG. 11. Next, the efficient solution for the subproblems in the x-update can be derived. For notational convenience, the iteration number k on the variables will be skipped. In the x-update, there are 2 subproblems (23) associated with each bus (node) i. The first problem, which updates $x_{i0}$, can be written explicitly as:

$$\min \quad H_{i0}(x_{i0}) \tag{33a}$$

$$\text{over} \quad x_{i0} = \{v_{i0}^{(x)}, \ell_{i0}^{(x)}, S_{i0}^{(x)}, s_{i0}^{(x)}\} \tag{33b}$$

$$\text{s.t.} \quad \begin{pmatrix} v_{i0}^{(x)} & S_{i0}^{(x)} \\ (S_{i0}^{(x)})^H & \ell_{i0}^{(x)} \end{pmatrix} \in \mathbb{S}_+ \tag{33c}$$

$$(s_{i0}^{\phi})^{(x)} \in \mathcal{T}_i^{\phi} \quad \phi \in \Phi_i, \tag{33d}$$

where $H_{i0}(x_{i0})$ is defined in (21) and for our application. $\|x_{i0} - y_{ij}\|_{M_{ij}}^2$ is chosen to be $$\|x_{i0} - y_{ij}\|_{M_{ij}}^2 = \begin{cases} (2|C_i| + 3)\|S_{i0}^{(x)} - S_{ii}^{(y)}\|_2^2 + \|s_{i0}^{(x)} - s_{ii}^{(y)}\|_2^2 + \\ \quad 2\|v_{i0}^{(x)} - v_{ii}^{(y)}\|_2^2 + (|C_i| + 1)\|\ell_{i0}^{(x)} - \ell_{ii}^{(y)}\|_2^2 & j = i \\ \|S_{i0}^{(x)} - S_{iA_j}^{(y)}\|_2^2 + \|\ell_{i,A_i}^{(x)} - \ell_i^{(y)}\|_2^2 & j = Ai \\ \|x_{i0} - y_{ij}\|_2^2 & j \in C_i \end{cases} \tag{34}$$

By using (34), $H_i^{(1)}(S_{i0}^{(x)}, 1_{i0}^{(x)}, v_{i0}^{(x)})$, which is defined below, can be written as the Euclidean distance of two Hermitian matrix. In many embodiments this can be a key reason that can lead to an efficient process.

Therefore, $H_{i0}(x_{i0})$ can be further decomposed as $$H_{i0}(x_{i0}) = f_i(x_{i0}) + \sum_{j \in N_i} \left( \langle \mu_{ij}, x_{i0} \rangle + \frac{\rho}{2} \|x_{i0} - y_{ij}\|_{M_{ij}}^2 \right) \tag{35}$$

$$= \frac{\rho(|C_i| + 2)}{2} H_i^{(1)}(S_{i0}^{(x)}, \ell_{i0}^{(x)}, v_{i0}^{(x)}) + H_i^{(2)}(s_{i0}^{(x)}) + \text{constant},$$

where $$H_i^{(1)}(S_{i0}^{(x)}, \ell_{i0}^{(x)}, v_{i0}^{(x)}) = \left\| \begin{pmatrix} v_{i0}^{(x)} & S_{i0}^{(x)} \\ (S_{i0}^{(x)})^H & \ell_{i0}^{(x)} \end{pmatrix} - \begin{pmatrix} \hat{v}_i & \hat{S}_i \\ \hat{S}_i^H & \hat{\ell}_i \end{pmatrix} \right\|_2^2$$

$$H_i^{(2)}(s_{i0}^{(x)}) = f_i(s_{i0}^{(x)}) + \frac{\rho}{2} \|s_{i0}^{(x)} - \hat{s}_i\|_2^2.$$

In various embodiments, the last step in (35) can be obtained using square completion and the variables labeled with hat are some constants.

Hence, the objective (33a) in (42) can be decomposed into two parts, where the first part $H^{(1)}(S_{i0}^{(x)}, 1_{i0}^{(x)}, v_{i0}^{(x)})$ involves variables $(S_{i0}^{(x)}, 1_{i0}^{(x)}, v_{i0}^{(x)})$ and the second part $H^{(2)}(s_{i0}^{(x)})$ involves $s_{i0}^{(x)}$. Note that the constraint (42a)-(42a) can also be separated into two independent constraints. Variables $(S_{i0}^{(x)}, 1_{i0}^{(x)}, v_{i0}^{(x)})$ only depend on (42a) and $s_{i0}^{(x)}$ depends on (42a). Then (42) can be decomposed into two subproblems, where the first one (36) solves the optimal $(S_{i0}^{(x)}, 1_{i0}^{(x)}, v_{i0}^{(x)})$ and the second one (37) solves the optimal $s_{i0}^{(x)}$. The first subproblem can be written explicitly as $$\min \quad H_i^{(1)}(S_{i0}^{(x)}, \ell_{i0}^{(x)}, v_{i0}^{(x)}) \tag{36}$$

$$\text{over} \quad S_{i0}^{(x)}, \ell_{i0}^{(x)}, v_{i0}^{(x)}$$

$$\text{s.t.} \quad \begin{pmatrix} v_{i0}^{(x)} & S_{i0}^{(x)} \\ (S_{i0}^{(x)})^H & \ell_{i0}^{(x)} \end{pmatrix} \in \mathbb{S}_+,$$

which can be solved using eigen-decomposition of a 6×6 matrix. In various embodiments:

$$W := \begin{pmatrix} \hat{v}_i & \hat{S}_i \\ \hat{S}_i^H & \hat{\ell}_i \end{pmatrix}$$

and $$X := \begin{pmatrix} v_{i0}^{(x)} & S_{i0}^{(x)} \\ (S_{i0}^{(x)})^H & \ell_{i0}^{(x)} \end{pmatrix}.$$

Then (36) can be written abbreviately as $$\min_X \|X - W\|_2^2$$

$$\text{s.t.}$$

$$X \in \mathbb{S}_+$$

which can be solved efficiently using eigen-decomposition. The second problem is $$\min \quad f_i(s_{i0}^{(x)}) + \frac{\rho}{2} \|s_{i0}^{(x)} - \hat{s}_i\|_2^2 \tag{37}$$

$$\text{over} \quad s_{i0}^{(x)} \in \mathcal{T}_i^{\phi} \quad \phi \in \Phi_i.$$

Recall that if $f_i(s_{i0}^{(x)}) = \Sigma_{\phi \in \Phi_i} f_i^{\phi}((s_{i0}^{\phi})^{(x)})$, then both the objective and constraint are separable for each phase $\phi \in \Phi_i$. Therefore, (37) can be further decomposed into $|\Phi_i|$ number of subproblems as below.

$$\min \quad f_i^{\phi}((s_{i0}^{\phi})^{(x)})$$

$$\text{over} \quad (s_{i0}^{\phi})^{(x)} \in \mathcal{T}_i^{\phi}, \tag{38}$$

which takes the same form as a closed form expression and thus can be solved with closed form solution based on the assumptions.

For the problem (43) that updates $x_{i1}$, which consists of only one component $v_{i1}^{(x)}$, it can be written explicitly as $$\min \quad H_{i1}(x_{i1})$$

$$\text{over} \quad x_{i1} = \{v_{i1}^{(x)}\}$$

$$\text{s.t.} \quad \underline{v}_i^{\phi} \leq (v_{i1}^{\phi\phi})^{(x)} \leq \overline{v}_i^{\phi} \quad \phi \in \Phi_i, \tag{39}$$

where $H_{i1}(x_{i1})$ is defined in (21) and for many embodiments of the present invention, $\|x_{ir} - y_{ii}\|_{\Lambda_{ir}}^2$ is chosen to be $$\|x_{ir} - y_{ii}\|_{\Lambda_{ir}}^2 = \|x_{ir} - y_{ii}\|_2^2$$

Then the closed form solution is given as:

$$(v_{i1}^{\phi_1 \phi_2})^{(x)} = \begin{cases} \left[ \frac{\lambda_{i1}^{\phi_1 \phi_2}}{\rho} + (v_{ii}^{\phi_1 \phi_2})^{(y)} \right]_{\underline{v}_i^{\phi_1}}^{\overline{v}_i^{\phi_1}} & \phi_1 = \phi_2 \\ \frac{\lambda_{i1}^{\phi_1 \phi_2}}{\rho} + (v_{ii}^{\phi_1 \phi_2})^{(y)} & \phi_1 \neq \phi_2 \end{cases}.$$

To summarize, the subproblems in the x-update for each bus (node) i can be solved either through a closed form solution or a eigen-decomposition of a 6×6 matrix.

In the y-update, the subproblem solved by each node i takes the form of (25) and can be written explicitly as $$\min \quad G_i(\{y_{ij} \mid j \in N_i\}) \tag{40}$$

$$\text{over} \quad \{y_{ij} \mid j \in N_i\}$$

$$\text{s.t.} \quad \mathcal{P}_i(v_{A_i;i}^{(y)}) = v_{ii}^{(y)} - z_i(S_{ii}^{(y)})^H - S_{ii}^{(y)}z_i^H + z_i \ell_{ii}^{(y)}z_i^H$$

$$s_{ii}^{(y)} = -\text{diag}\left(\sum_{i \in C_i} \mathcal{P}_i(S_{ji}^{(y)} - z_j \ell_{ii}^{(y)}) - S_{ii}^{(y)}\right),$$

which has a closed form solution given in (27).

Finally, the initialization and stopping criteria for the process can be specified. A good initialization usually reduces the number of iterations for convergence. In various embodiments, the following initialization can be used. The auxiliary variables $\{V_i | i \in \mathcal{N}\}$ and $\{I_i | i \in E\}$ can first be initialized, which represent the complex nodal voltage and branch current, respectively. Then these auxiliary variables can be used to initialize the variables in (32). Intuitively, the above initialization procedure can be interpreted as finding a solution assuming zero impedance on all the lines. The procedure is formally stated in in FIG. 12 which illustrates pseudocode for initialization of a process in accordance with an embodiment of the invention.

For the stopping criteria, there is no general rule for ADMM based processes and stopping criteria usually hinge on the particular problem. It can be argued that a reasonable stopping criteria is that both the primal residual $r^k$ defined in (14a) and the dual residual $s^k$ defined in (14b) are below $10^{-4}\sqrt{|\mathcal{N}|}$. Various embodiments of the present invention adopt criteria and the empirical results show that the solution is accurate enough. The pseudocode for a complete process in accordance with many embodiments of the invention are illustrated in FIG. 13. It should readily be apparent that many other stopping criteria for ADMM based processes can be used.

Simulated Results

The scalability of the distributed process can be demonstrated by testing it on the standard IEEE test feeders. To show the efficiency of an implementation of the process in accordance with an embodiment of the invention, the computation time of solving the subproblems in both the x and y-update with off-the-shelf solver (CVX) can also be compared. A simulated process in accordance with several embodiments of the invention can be run on networks of different topology to understand the factors that affect the convergence rate. The simulated process is implemented in Python and run on a Macbook pro 2014 with i5 dual core processor.

Simulations on IEEE Test Feeders

The IEEE 13, 34, 37, 123 bus (node) distribution systems can test a simulated process. In a simulation of the present invention, all the networks are unbalanced three phase networks. The substation is modeled as a fixed voltage bus (node) (1 p.u.) with infinite power injection capability. The other buses (nodes) are modeled as load buses (nodes) whose voltage magnitude at each phase can vary within [0.95, 1.05] p.u. and power injections are specified in the test feeder. There is no controllable device in the original IEEE test feeders, and hence the OPF problem degenerates to a power flow problem. To demonstrate the effectiveness of the process, all the capacitors can be replaced with inverters, whose reactive power injection ranges from 0 to the maximum ratings specified by the original capacitors. The objective is to minimize power loss across the network, namely $f_i^\phi(s_i^\phi) = p_i^\phi$ for $\phi \in \Phi_i$ and $i \in \mathcal{N}$.

In various simulations, the focus can be the time of convergence (ToC) for the distributed process. Furthermore, the process is simulated on a single machine. To roughly estimate the ToC (excluding communication overhead) if the process is run on multiple machines in a distributed manner, the total time by can be divided by the number of buses (nodes).

FIG. 14 illustrates the simulated IEEE 13, 34, 37, 123 bus (node) distribution systems number of iterations to converge, total computation time required to run on a single machine and the average time required for each node if the process is run on multiple machines excluding communication overhead. From the simulation results, a process in accordance with many embodiments of the invention converges within 2.5 second for all the standard IEEE test networks if the process is run in a distributed manner.

Moreover, the advantage of using a process in accordance with an embodiment of the invention can be shown by comparing the computation time of solving the subproblems between off-the-shelf solver (CVX) and a simulated process in accordance with various embodiments of the invention. In particular, the average computation time of solving the subproblem in both the x and y update can be compared. In the x-update, the average time required to solve the subproblem (40) is $9.8 \times 10^{-5}$ s for a simulated process but 0.13 s for CVX. In the y-update, the average time required to solve the subproblems (42)-(43) are $3.7 \times 10^{-3}$ s for our algorithm but 0.45 s for CVX. Thus, each ADMM iteration takes about $3.8 \times 10^{-3}$ s for a simulated process in accordance with many embodiments of the invention but $5.8 \times 10^{-1}$ s for using an iterative algorithm, a more than 100× speedup.

Simulated Network Topology

A distributed process in accordance with an embodiment of the invention can dramatically reduce the computation time within each iteration as described above. The time of convergence (ToC) can be determined by both the computation time required within each iteration and the number of iterations. The number of iterations, namely the rate of convergence can be simulated.

Rate of convergence can be determined by many different factors. In several embodiments of the present invention, the rate of convergence from two factors, network size N, and diameter D can be considered, i.e. given the termination criteria similar to pseudocode for a distributed OPF process as illustrated in FIG. 13 above, the impact of network size and diameter on the number of iterations. It should readily be appreciated, the impact from other factors, e.g. form of objective function and constraints can additionally be simulated.

Figure 15A:
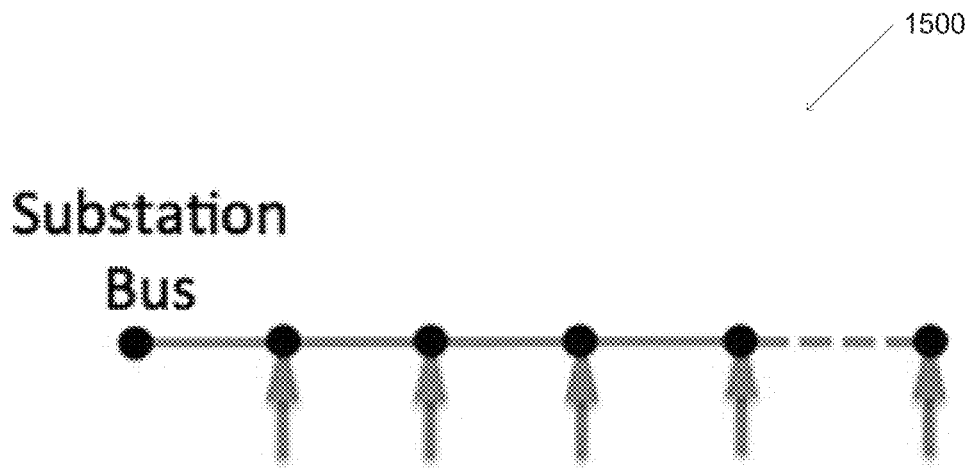
FIGS. 15A-15B are diagrams illustrating the topologies for a line and a fat tree network respectively, in accordance with an embodiment of the invention.
Figure 15B:
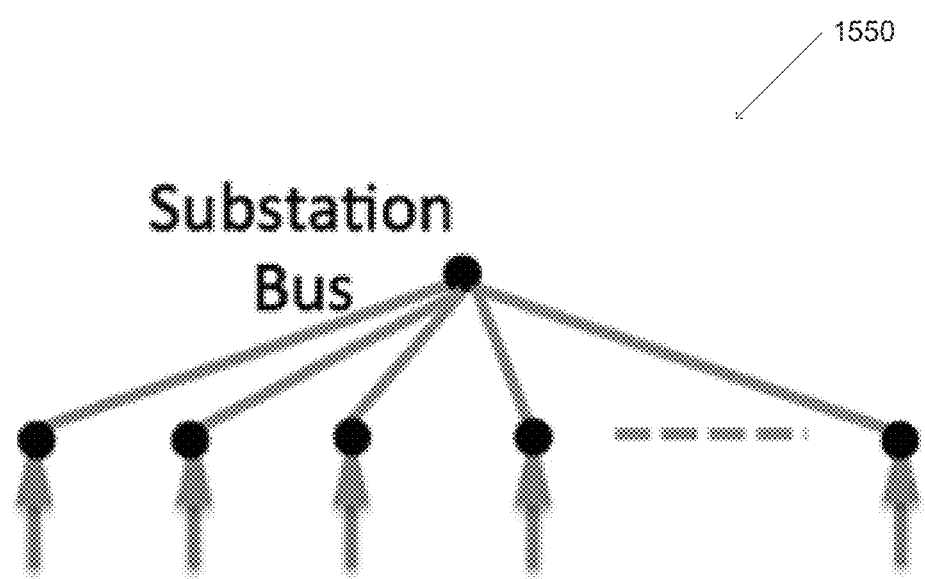

To illustrate the impact of network size N and diameter D on the rate of convergence, the process of two extreme cases can be simulated: 1) Line network as illustrated in FIG. 15A, whose diameter is the largest given the network size, and 2) Fat tree network as illustrated in FIG. 15B, whose diameter is the smallest given the network size. FIG. 16 illustrates simulated results from processes using a line network and a fat tree network including the number of iterations for both line and fat tree network of different sizes. For the line network, the number of iterations increases notably as the size increases. For the fat tree network, the trend is less obvious compared to line network. In many embodiments of the invention, network diameter has a stronger impact than the network size on the rate of convergence.

Although the present invention has been described in certain specific aspects, many additional modifications and variations would be apparent to those skilled in the art. It is therefore to be understood that the present invention can be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A node controller, comprising:
 a network interface;
 a processor;
 a memory containing:
  a distributed power control application;
  a plurality of node operating parameters describing the operating parameter of a node in an unbalanced network; and
  a plurality of node operating parameters describing operating parameters for a set of at least one node selected from the group consisting of an ancestor node and at least one child node;
 wherein the processor is configured by the distributed power control application to:
 send node operating parameters to nodes in the set of at least one node;
 receive operating parameters from the nodes in the set of at least one node;
 calculate a plurality of updated node operating parameters using an iterative process to determine the updated node operating parameters using the node operating parameters that describe the operating parameters of the node, and the operating parameters of the set of at least one node, where each iteration in the iterative process involves evaluation of a subproblem; and
 adjust the node operating parameters based on the calculated plurality of updated node operating parameters.

2. The node controller of claim 1, wherein the subproblem further comprises a closed form solution.

3. The node controller of claim 1, wherein the subproblem further comprises an eigen-decomposition.

4. The node controller of claim 1, wherein the iterative process further comprises an alternating direction method of multipliers (ADMM) process.

5. The node controller of claim 4, wherein the ADMM process further comprises an x-update process, wherein the x-update process comprises minimizing an augmented Lagrangian for an augmented Relaxed Optimal Power Flow (ROPF) expression.

6. The node controller of claim 5, wherein the x-update process is subject to the following constraints:

$$\min \quad H_{i0}(x_{i0})$$

$$\text{over} \quad x_{io} = \{v_{io}^x, \ell_{io}^x, S_{io}^x, s_{i0}^x\}$$

$$\text{s.t.} \quad \begin{pmatrix} v_{i0}^{(x)} & S_{i0}^{(x)} \\ (S_{i0}^{(x)})H & \ell_{i0}^{(x)} \end{pmatrix} \in \mathbb{S}_+$$

$$(s_{i0}^\Phi)^{(x)} \in J_i^\Phi \quad \Phi \in \Phi_i,$$

$$\min \quad H_{i1}(x_{i1})$$

$$\text{over} \quad x_{i1} = \{v_{i1}^{(x)}\}$$

$$\text{s.t.} \quad \underline{v}_i^\Phi \leq (v_{i1}^{\Phi\Phi})^{(x)} \leq \overline{v}_i^\Phi \quad \Phi \in \Phi_i,$$

where H is a hermitian matrix, i is the node, v, l, S, and s are constraints, $\mathbb{S}$ is a set of hermitian matrics, and φ is a phase of the unbalanced network.

7. The node controller of claim 4, wherein the ADMM process further comprises a y-update process, where the y-update process comprises minimizing an augmented Lagrangian for an augmented Relaxed Optimal Power Flow (ROPF) expression.

8. The node controller of claim 7, wherein the y-update process is subject to the following constraints:

$$\min \quad G_i(\{y_{ji} \mid j \in N_i\})$$

$$\text{over} \quad \{y_{ji} \mid j \in N_i\}$$

$$\text{s.t.} \quad P_i(v_{A_i j}^{(y)}) = v_{ii}^{(y)} - z_i(S_{ii}^{(y)})^H - S_{ii}^{(y)} z_i^H + z_i \ell_{ii}^{(y)} z_i^H$$

$$s_{ii}^{(y)} = -\text{diag}\left(\sum_{i \in C_i} P_i(S_{ji}^{(y)} - z_j \ell_{ji}^{(y)}) - S_{ii}^{(y)}\right),$$

where G and N are matrices, i is the node, j is the child node, $A_i$ is the ancestor node, $C_i$ is the set of child nodes, and v, l, S, and s are constraints.

9. The node controller of claim 4, wherein the ADMM process further comprises a Lagrange multiplier update process, where the Lagrange multiplier expression comprises a set of Lagrange multipliers.

10. The node controller of claim 9, wherein each Lagrange multiplier in the set of Lagrange multipliers is evaluated by the processor using the following expression:

$$\lambda^{k+1} = \lambda^k + p(x^{k+1} - y^{k+1})$$

where λ is a Lagrange multiplier in the set of Lagrange multipliers, k is a current iteration, k+1 is a next iteration, p is a constant, and x-y is a constraint,
wherein the updated node operating parameters are further calculated using the node operating parameters that describe a set of operating parameters of at least one node selected from the group consisting of an ancestor node of the ancestor node and at least one child node of the at least one child node,
wherein the node operating parameters include power injection, voltage, branch current to the ancestor node, and branch power flow to the ancestor node.

11. The node controller of claim 1, wherein the updated node operating parameters are further calculated using the node operating parameters that describe a set of operating parameters of at least one node selected from the group consisting of an ancestor node of the ancestor node and at least one child node of the at least one child node.

12. The node controller of claim 1, wherein the node operating parameters include power injection, voltage, branch current to the ancestor node, and branch power flow to the ancestor node.

13. A power distribution network, comprising:
 one or more centralized computing systems;
 a communications network;
 a plurality of node controllers, wherein each node controller in the plurality of node controllers contains:
  a network interface;
  a node processor; and
  a memory containing:
   a distributed power control application;
   a plurality of node operating parameters describing the operating parameters of a node in an unbalanced network;

a plurality of node operating parameters describing operating parameters for a set of at least one node selected from the group consisting of an ancestor node and at least one child node;
wherein the node processor is configured by the distributed power control application to:
send node operating parameters to nodes in the set of at least one node;
receive operating parameters from the nodes in the set of at least one node;
calculate a plurality of updated node operating parameters using an iterative process to determine the updated node operating parameters using the node operating parameters that describe the operating parameters of the node, and the operating parameters of the nodes in the set of at least one node, where each iteration in the iterative process involves evaluation of a subproblem; and
adjust the node operating parameters based on the calculated plurality of updated node operating parameters.

14. The power distribution network of claim 13, wherein the subproblem further comprises a closed form solution.

15. The power distribution network of claim 13, wherein the subproblem further comprises an eigen-decomposition.

16. The power distribution network of claim 13, wherein the iterative process is part of a distributed process for achieving Optimal Power Flow (OPF) that is simplified using a convex relaxation.

17. The power distribution network of claim 13, wherein the convex relaxation is a semidefinite program (SDP).

18. The power distribution network of claim 13, wherein the node controllers are modeled in the centralized computing system as an unbalanced radial network.

19. The power distribution network of claim 13, wherein the iterative process further comprises an alternating direction method of multipliers (ADMM) process.

20. The power distribution network of claim 19, wherein the ADMM process further comprises an x-update process, wherein the x-update process comprises minimizing an augmented Lagrangian for an augmented Relaxed Optimal Power Flow (ROPF) expression.

21. The power distribution network of claim 20, wherein the x-update process is subject to the following constraints:

$$\min \quad H_{i0}(x_{i0})$$
$$\text{over} \quad x_{io} = \{v_{io}^x, \ell_{io}^x, S_{io}^x, s_{io}^x\}$$
$$\text{s.t.} \quad \begin{pmatrix} v_{i0}^{(x)} & S_{i0}^{(x)} \\ (S_{i0}^{(x)})^H & \ell_{i0}^{(x)} \end{pmatrix} \in \mathbb{S}_+$$
$$(s_{i0}^\Phi)^{(x)} \in J_i^\Phi \quad \Phi \in \Phi_i,$$

-continued
$$\min \quad H_{i1}(x_{i1})$$
$$\text{over} \quad x_{i1} = \{v_{i1}^{(x)}\}$$
$$\text{s.t.} \quad \underline{v}_i^\Phi \le (v_{i1}^{\Phi\Phi})^{(x)} \le \overline{v}_i^\Phi \quad \Phi \in \Phi_i,$$

where H is a hermitian matrix, i is the node, v, l, S, and s are constraints, $\mathbb{S}$ is a set of hermitian matrics, and φ is a phase of the unbalanced network.

22. The power distribution network of claim 19, wherein the ADMM process further comprises a y-update process, where the y-update process comprises minimizing an augmented Lagrangian for an augmented Relaxed Optimal Power Flow (ROPF) expression.

23. The power distribution process of claim 22, wherein the y-update process is subject to the following constraints:

$$\min \quad G_i(\{y_{ji} \mid j \in N_i\})$$
$$\text{over} \quad \{y_{ji} \mid j \in N_i\}$$
$$\text{s.t.} \quad P_i(v_{A_i j}^{(y)}) = v_{ii}^{(y)} - z_i(S_{ii}^{(y)})^H - S_{ii}^{(y)} Z_i^H + z_i \ell_{ii}^{(y)} z_i^H$$
$$s_{ii}^{(y)} = -\text{diag}\left(\sum_{i \in C_i} P_i(S_{ji}^{(y)} - z_j \ell_{ji}^{(y)}) - S_{ii}^{(y)}\right),$$

where G and N are matrices, i is the node, j is the child node, $A_i$ is the ancestor node, $C_i$ is the set of child nodes, and v, l, S, and s are constraints.

24. The power distribution network of claim 19, wherein the ADMM process further comprises a Lagrange multiplier update process, where the Lagrange multiplier expression comprises a set of Lagrange multipliers.

25. The power distribution network of claim 24, wherein each Lagrange multiplier in the set of Lagrange multipliers is evaluated by the processor using the following expression:

$$\lambda^{k+1} = \lambda^k + \rho(x^{k+1} - y^{k+1})$$

where λ is a Lagrange multiplier in the set of Lagrange multipliers, k is a current iteration, k+1 is a next iteration, ρ is a constant, and x-y is a constraint.

26. The power distribution process of claim 13, wherein the updated node operating parameters are further calculated using the node operating parameters that describe a set of operating parameters of at least one node selected from the group consisting of an ancestor node of the ancestor node and at least one child node of the at least one child node.

27. The power distribution process of claim 13, wherein the node operating parameters include power injection, voltage, branch current to the ancestor node, and branch power flow to the ancestor node.

* * * * *